(12) United States Patent
Tucker et al.

(10) Patent No.: US 9,809,078 B2
(45) Date of Patent: Nov. 7, 2017

(54) MULTI-PATH FLUID DIVERTER VALVE

(71) Applicant: Levant Power Corporation, Woburn, MA (US)

(72) Inventors: Clive Tucker, Charlestown, MA (US); Johannes Schneider, Cambridge, MA (US); Colin Patrick O'Shea, Cambridge, MA (US); Marco Giovanardi, Melrose, MA (US); Richard Anthony Zuckerman, Somerville, MA (US); Patrick W. Neil, Randolph, MA (US)

(73) Assignee: ClearMotion, Inc., Woburn, MA (US)

( * ) Notice: Subject to any disclaimer, the term of this patent is extended or adjusted under 35 U.S.C. 154(b) by 0 days.

(21) Appl. No.: 14/777,068

(22) PCT Filed: Mar. 14, 2014

(86) PCT No.: PCT/US2014/027389
§ 371 (c)(1),
(2) Date: Sep. 15, 2015

(87) PCT Pub. No.: WO2014/152482
PCT Pub. Date: Sep. 25, 2014

(65) Prior Publication Data
US 2016/0031285 A1     Feb. 4, 2016

Related U.S. Application Data

(60) Provisional application No. 61/865,970, filed on Aug. 14, 2013, provisional application No. 61/815,251, (Continued)

(51) Int. Cl.
*B60G 17/016* (2006.01)
*F15B 13/044* (2006.01)
(Continued)

(52) U.S. Cl.
CPC ........ *B60G 17/016* (2013.01); *F15B 13/0444* (2013.01); *F16K 11/065* (2013.01);
(Continued)

(58) Field of Classification Search
CPC ..... F15B 13/044; B60G 17/016; F16K 31/12; F16K 11/065; F03C 1/26; F03C 1/013; F01C 13/00; F01C 1/103; F01C 9/002
(Continued)

(56) References Cited

U.S. PATENT DOCUMENTS 998,128 A     7/1911   Smith
1,116,293 A   11/1914  Kane
(Continued)

FOREIGN PATENT DOCUMENTS

CN    1325799 A    12/2001
CN    1370926 A    9/2002
(Continued)

OTHER PUBLICATIONS

[No Author Listed] Ride control innovation, accelerated[SM]. Forward thinking. Forward moving. ACOCAR. Tenneco. Sep. 2011.
(Continued)

*Primary Examiner* — Melanie Torres Williams
(74) *Attorney, Agent, or Firm* — Wolf, Greenfield & Sacks, P.C.

(57) ABSTRACT

A multi-path fluid flow control valve for a shock absorber that restricts fluid into a first path while opening fluid flow to a second path when a given fluid flow velocity is reached. Exemplary configurations of this diverter valve are disclosed such as a spring loaded disc valve with face sealing lands, and a spool valve with diametric sealing lands. Applications include active suspension dampers in order to limit maximum RPM into a hydraulic motor. For such a system, in one mode the diverter valve allows fluid to move unrestricted
(Continued)

into the hydraulic motor. When fluid velocity reaches a tunable set point, in a second mode the diverter valve restricts flow into the hydraulic motor and bypasses it shuttling fluid into the opposite side of the damper. In some cases progressive damping valves are utilized in series or parallel to smooth damping characteristics during, before, and after transitions.

20 Claims, 32 Drawing Sheets

Related U.S. Application Data filed on Apr. 23, 2013, provisional application No. 61/789,600, filed on Mar. 15, 2013.

(51) Int. Cl.
  *F16K 11/065* (2006.01)
  *F16K 31/12* (2006.01)
  *B60G 15/10* (2006.01)

(52) U.S. Cl.
  CPC .............. *F16K 31/12* (2013.01); *B60G 15/10* (2013.01); *B60G 2202/413* (2013.01); *B60G 2204/11* (2013.01); *B60G 2400/0511* (2013.01); *B60G 2400/0521* (2013.01); *B60G 2400/60* (2013.01); *B60G 2800/70* (2013.01)

(58) Field of Classification Search
  USPC .................................... 188/266.2; 280/5.515
  See application file for complete search history.

(56) References Cited

U.S. PATENT DOCUMENTS

| | | | |
|---|---|---|---|
| 1,290,293 A | 1/1919 | Morski |
| 2,194,530 A | 3/1940 | Torstensson |
| 2,885,202 A | 5/1959 | Trumper et al. |
| 2,958,292 A | 11/1960 | Lipe et al. |
| 3,507,580 A | 4/1970 | Howard et al. |
| 3,515,889 A | 6/1970 | Kammerer |
| 3,559,027 A | 1/1971 | Arsem |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,872,701 A | 10/1989 | Akatsu et al. |
| 4,887,699 A | 12/1989 | Ivers et al. |
| 4,908,553 A | 3/1990 | Hoppie et al. |
| 4,921,080 A | 5/1990 | Lin |
| 4,924,393 A | 5/1990 | Kurosawa |
| 4,936,423 A | 6/1990 | Karnopp |
| 4,981,309 A | 1/1991 | Froeschle et al. |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,360,445 A | 11/1994 | Goldowsky |
| 5,377,791 A | 1/1995 | Kawashima et al. |
| 5,391,953 A | 2/1995 | van de Veen |
| 5,425,436 A | 6/1995 | Teramura et al. |
| 5,480,186 A | 1/1996 | Smith |
| 5,497,324 A | 3/1996 | Henry et al. |
| 5,529,152 A | 6/1996 | Hamilton et al. |
| 5,570,286 A | 10/1996 | Margolis et al. |
| 5,572,425 A | 11/1996 | Levitt et al. |
| 5,590,734 A | 1/1997 | Caires |
| 5,608,308 A | 3/1997 | Kiuchi et al. |
| 5,659,205 A | 8/1997 | Weisser et al. |
| 5,682,980 A | 11/1997 | Reybrouck |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,856,709 A | 1/1999 | Ibaraki et al. |
| 5,892,293 A | 4/1999 | Lucas |
| 5,941,328 A | 8/1999 | Lyons et al. |
| 5,944,153 A | 8/1999 | Ichimaru |
| 5,987,368 A | 11/1999 | Kamimae et al. |
| 5,999,868 A | 12/1999 | Beno et al. |
| 6,025,665 A | 2/2000 | Poag |
| 6,049,746 A | 4/2000 | Southward et al. |
| 6,092,618 A | 7/2000 | Collier-Hallman |
| 6,111,375 A | 8/2000 | Zenobi |
| 6,161,844 A | 12/2000 | Charaudeau et al. |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,397,134 B1 | 5/2002 | Shal et al. |
| 6,441,508 B1 | 8/2002 | Hylton |
| 6,452,535 B1 | 9/2002 | Rao et al. |
| 6,502,837 B1 | 1/2003 | Hamilton et al. |
| 6,519,517 B1 | 2/2003 | Heyring et al. |
| 6,519,939 B1 | 2/2003 | Duff |
| 6,559,553 B2 | 5/2003 | Yumita |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |
| 6,908,162 B2 | 6/2005 | Obayashi et al. |
| 6,920,951 B2 | 7/2005 | Song et al. |
| 6,944,544 B1 | 9/2005 | Prakah-Asante et al. |
| 6,952,060 B2 | 10/2005 | Goldner |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,051,526 B2 | 5/2006 | Geiger |
| 7,087,342 B2 | 8/2006 | Song |
| 7,195,250 B2 | 3/2007 | Knox et al. |
| 7,206,678 B2 | 4/2007 | Arduc et al. |
| 7,335,999 B2 | 2/2008 | Potter |
| 7,336,002 B2 | 2/2008 | Kato et al. |
| 7,392,998 B2 | 7/2008 | Runkel |
| 7,421,954 B2 | 9/2008 | Bose |

(56) References Cited

U.S. PATENT DOCUMENTS

| | | |
|---|---|---|
| 7,427,072 B2 | 9/2008 | Brown |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,938,217 B2 | 5/2011 | Stansbury |
| 7,963,529 B2 | 6/2011 | Oteman et al. |
| 8,063,498 B2 | 11/2011 | Namuduri et al. |
| 8,067,863 B2 | 11/2011 | Giovanardi |
| 8,079,436 B2 | 12/2011 | Tikkanen et al. |
| 8,080,888 B1 | 12/2011 | Daley |
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,475,137 B2 | 7/2013 | Kobayashi et al. |
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | van der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 9,035,477 B2 | 5/2015 | Tucker et al. |
| 9,174,508 B2 | 11/2015 | Anderson et al. |
| 9,260,011 B2 | 2/2016 | Anderson et al. |
| 9,440,507 B2 | 9/2016 | Giovanardi et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0083629 A1 | 5/2004 | Kondou |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0211631 A1 | 10/2004 | Hsu |
| 2004/0212273 A1 | 10/2004 | Gould |
| 2005/0017462 A1 | 1/2005 | Kroppe |
| 2005/0121268 A1 | 6/2005 | Groves et al. |
| 2005/0178628 A1 | 8/2005 | Uchino et al. |
| 2005/0280318 A1 | 12/2005 | Parison et al. |
| 2006/0090462 A1 | 5/2006 | Yoshino |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0021886 A1 | 1/2007 | Miyajima |
| 2007/0088475 A1 | 4/2007 | Nordgren et al. |
| 2007/0088919 A1 | 4/2007 | de la Torre et al. |
| 2007/0089924 A1 | 4/2007 | de la Torre et al. |
| 2007/0120332 A1 | 5/2007 | Bushko et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238396 A1 | 10/2008 | Ng et al. |
| 2008/0257626 A1 | 10/2008 | Carabelli et al. |
| 2009/0015202 A1 | 1/2009 | Miura et al. |
| 2009/0192674 A1 | 7/2009 | Simons |
| 2009/0212649 A1 | 8/2009 | Kingman et al. |
| 2009/0229902 A1 | 9/2009 | Stansbury |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Anderson et al. |
| 2010/0217491 A1 | 8/2010 | Naito et al. |
| 2010/0244457 A1 | 9/2010 | Bhat et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0001399 A1* | 1/2012 | Coombs ............... B60G 17/08 280/124.161 |
| 2012/0010780 A1 | 1/2012 | Hayashi et al. |
| 2012/0055745 A1 | 3/2012 | Buettner et al. |
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0305347 A1 | 12/2012 | Mori et al. |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0005888 A1 | 1/2014 | Bose et al. |
| 2014/0012467 A1 | 1/2014 | Knox et al. |
| 2014/0012468 A1 | 1/2014 | Le et al. |
| 2014/0095022 A1 | 4/2014 | Cashman et al. |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1 | 9/2014 | Hou |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |
| 2014/0297116 A1* | 10/2014 | Anderson ............... H02K 5/12 701/37 |
| 2014/0297117 A1 | 10/2014 | Near et al. |
| 2014/0297119 A1 | 10/2014 | Giovanardi et al. |
| 2014/0346783 A1 | 11/2014 | Anderson et al. |
| 2015/0192114 A1 | 7/2015 | Triebel et al. |
| 2015/0224845 A1 | 8/2015 | Anderson et al. |
| 2015/0316039 A1 | 11/2015 | Tucker et al. |
| 2016/0059664 A1 | 3/2016 | Tucker et al. |
| 2016/0075205 A1 | 3/2016 | Anderson et al. |
| 2016/0097406 A1 | 4/2016 | Zuckerman et al. |
| 2016/0114643 A1 | 4/2016 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| DE | 3937987 A1 | 5/1991 |
| DE | 195 35 752 A1 | 3/1997 |
| EP | 0 363 158 A2 | 4/1990 |
| EP | 1 878 598 | 1/2008 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S59-187124 A | 10/1984 |
| JP | 3-123981 U1 | 12/1991 |
| JP | H05-50195 U | 7/1993 |
| JP | 8-226377 A2 | 9/1996 |
| JP | 2001-311452 A | 9/2001 |
| JP | 2003-035254 | 2/2003 |
| JP | 2005-180689 A | 7/2005 |
| JP | 2005-521820 | 7/2005 |
| JP | 2008-536470 A | 9/2008 |
| WO | WO 97/26145 A | 7/1997 |

(56) References Cited

FOREIGN PATENT DOCUMENTS

| WO | WO 2007/071362 A1 | 6/2007 |
|---|---|---|
| WO | PCT/US2009/040749 | 7/2009 |
| WO | WO 2010/066416 A1 | 6/2010 |
| WO | PCT/US2010/002116 | 10/2010 |
| WO | PCT/US2010/0002105 | 12/2011 |
| WO | WO 2011/159874 A2 | 12/2011 |
| WO | PCT/US2011/040654 | 1/2012 |
| WO | WO 2012/167316 A1 | 12/2012 |
| WO | PCT/US2014/027389 | 10/2014 |
| WO | PCT/US2014/029654 | 10/2014 |
| WO | PCT/US2014/029937 | 11/2014 |
| WO | PCT/US2014/035199 | 11/2014 |

OTHER PUBLICATIONS

Cleasby et al., A novel high efficiency electrohydrostatic flight simulator motion system. Fluid Pow Mot Control. Centre for PTMC, UK. 2008;437-449.

Kaminaga et al., Mechanism and Control of knee power augmenting device with backdrivable electro-hydrostatic actuator. 13th World congress Mechanism Machine Science. Jun. 19-25, 2011. 1-10.

Shen et al., Automative electric power and energy mangement—a system approach. Business Briefing: Global Automotive Manufacturing and Technology. 2003:1-5.

Vandersmissen, ACOCAR active suspension. Vehicle Dynamics Expo. Stuttgart, Jul. 5, 2008. 24 pages.

Vandersmissen et al., The new Tenneco ACOCAR active suspension. Vehicle Dynamics Expo. Stuttgart, Jun. 22-24, 2010. 19 pages.

U.S. Appl. No. 14/989,725, filed Jan. 6, 2016, Anderson et al.

U.S. Appl. No. 14/859,892, filed Sep. 21, 2015, Anderson et al.

U.S. Appl. No. 14/786,414, filed Oct. 22, 2015, Tucker et al.

U.S. Appl. No. 14/750,357, filed Jun. 25, 2015, Giarratana et al.

U.S. Appl. No. 14/801,787, filed Jul. 16, 2015, Tucker et al.

U.S. Appl. No. 14/876,796, filed Oct. 6, 2015, Zuckerman et al.

U.S. Appl. No. 14/800,201, filed Jul. 15, 2015, Giarratana et al.

\* cited by examiner

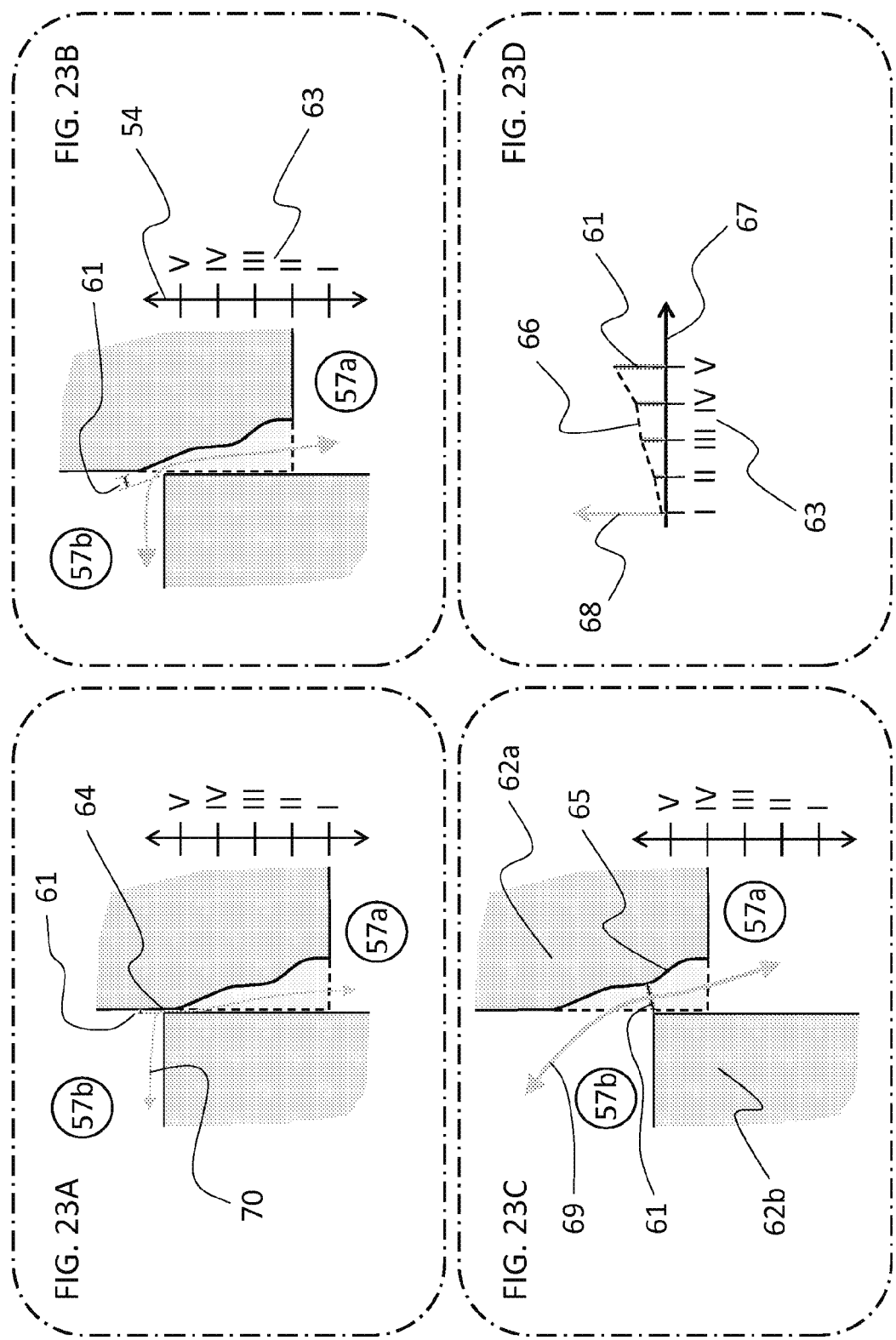

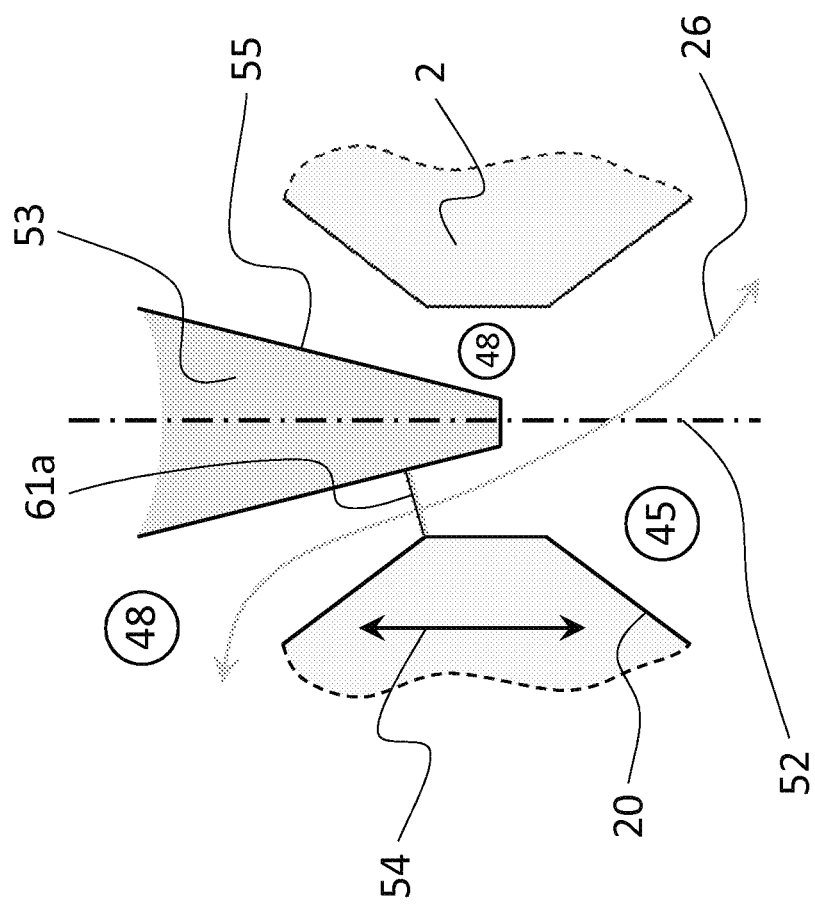

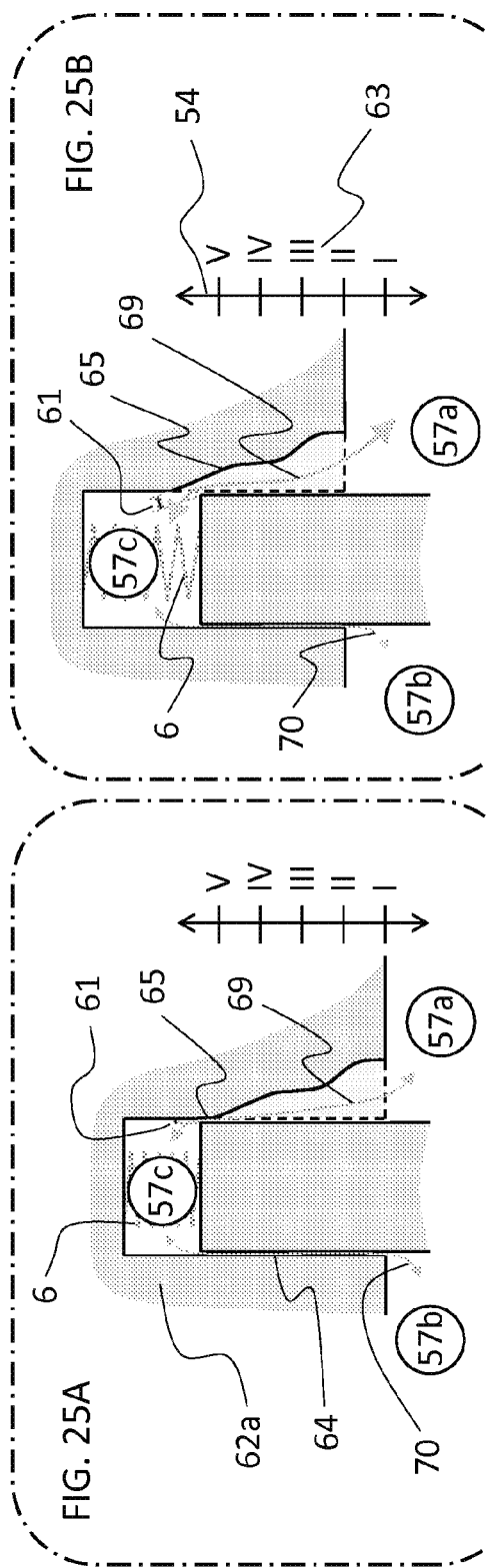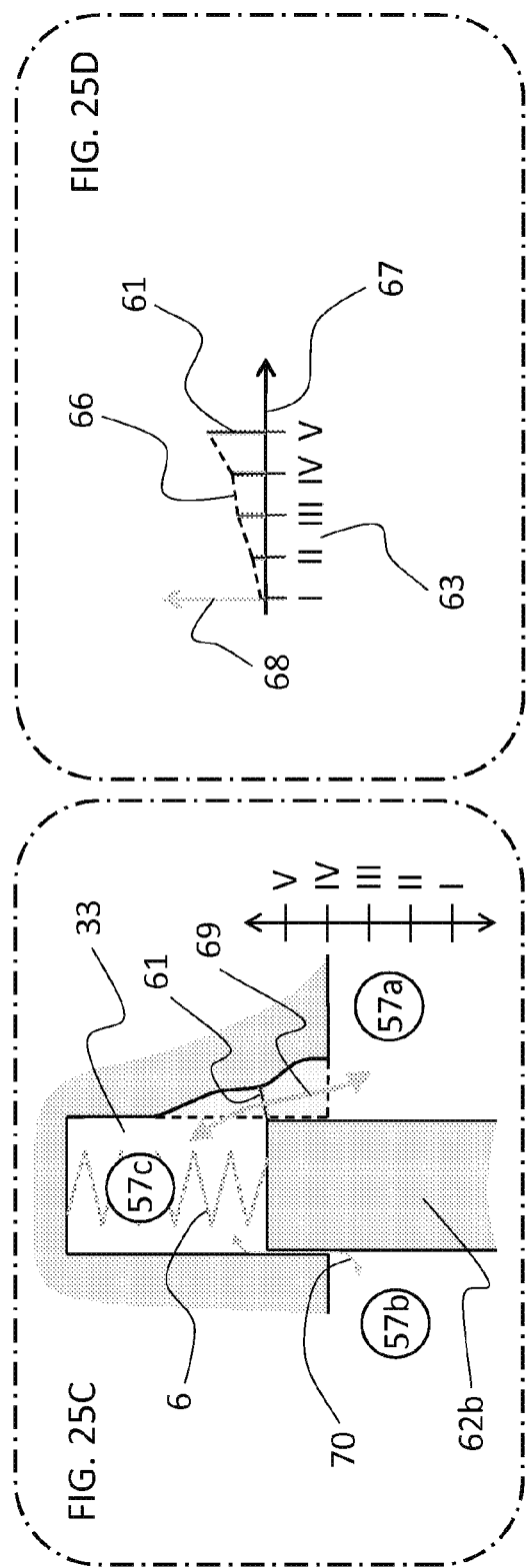

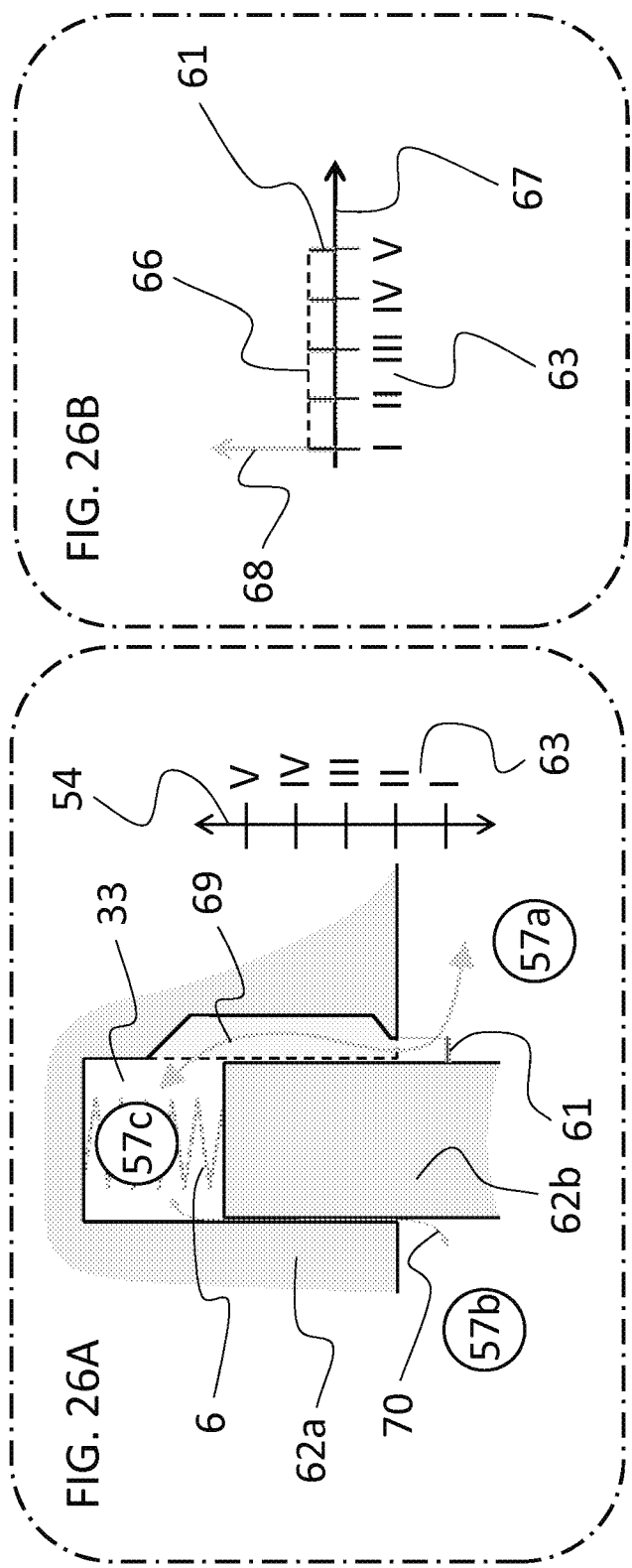

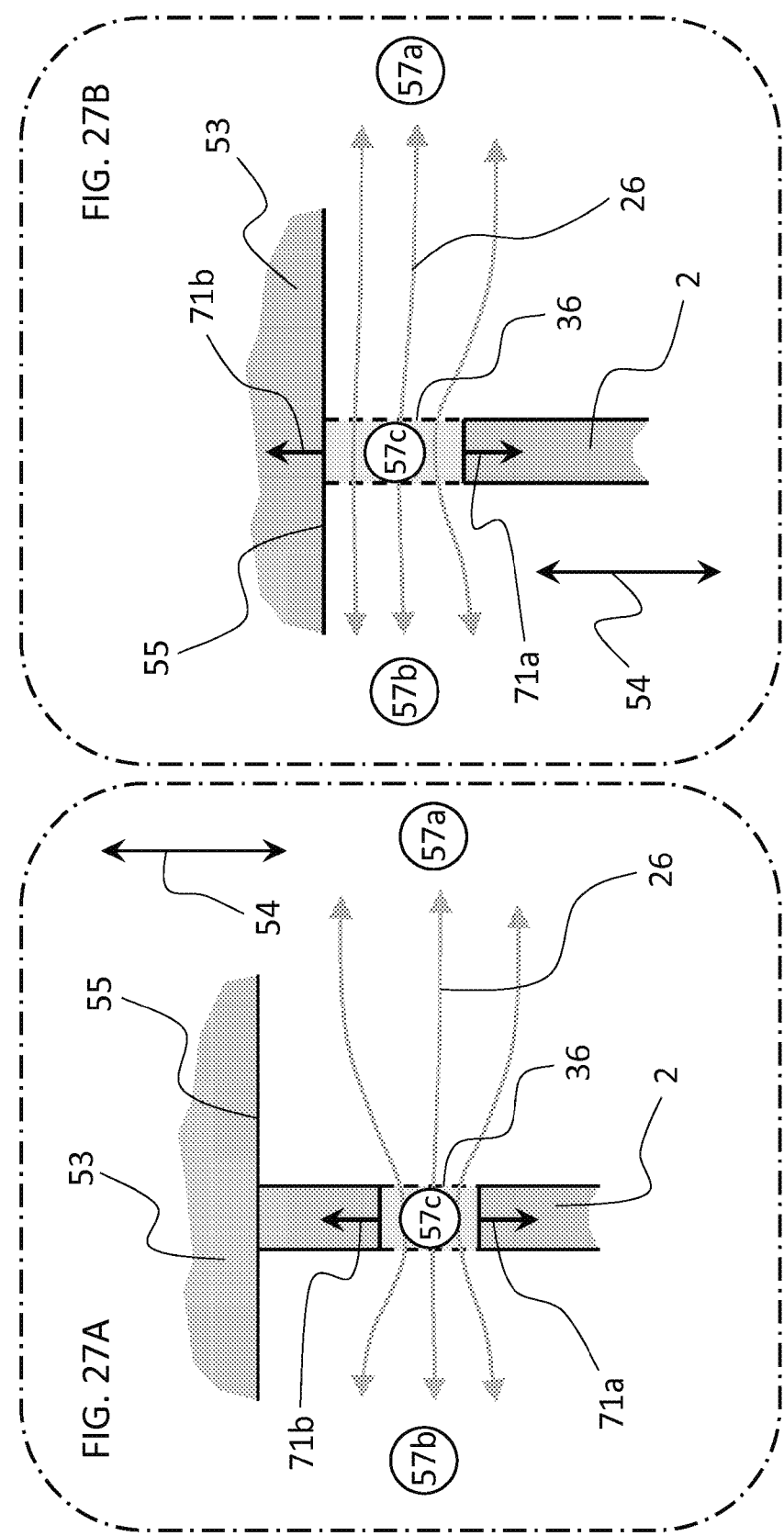

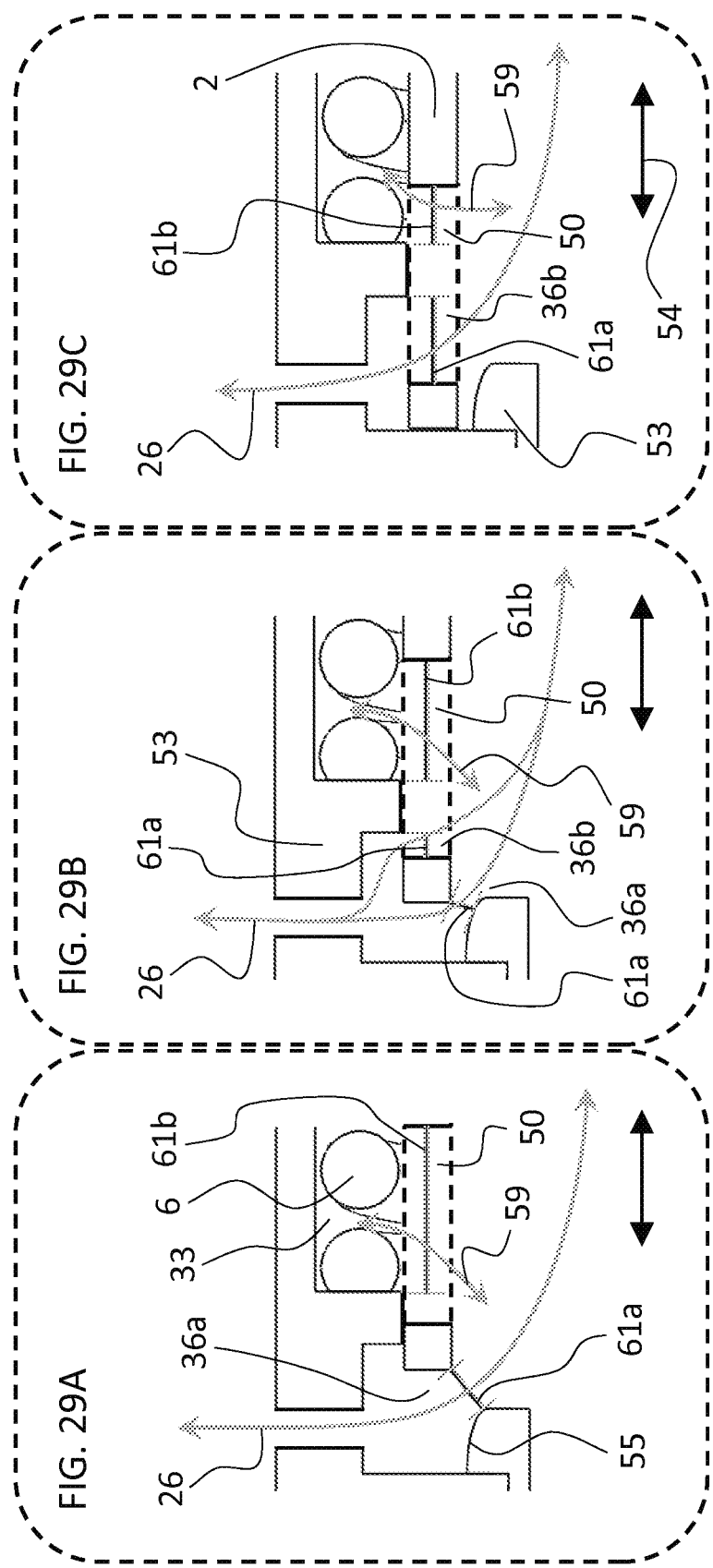

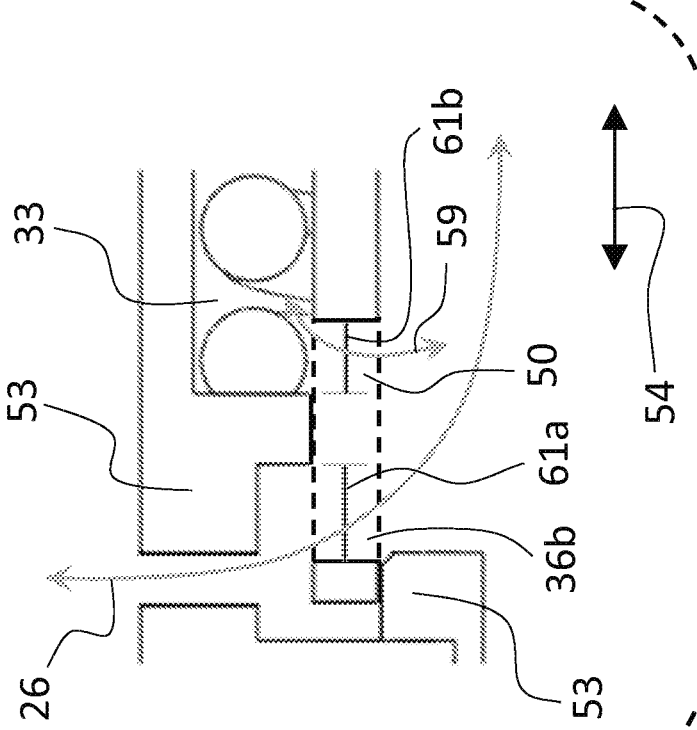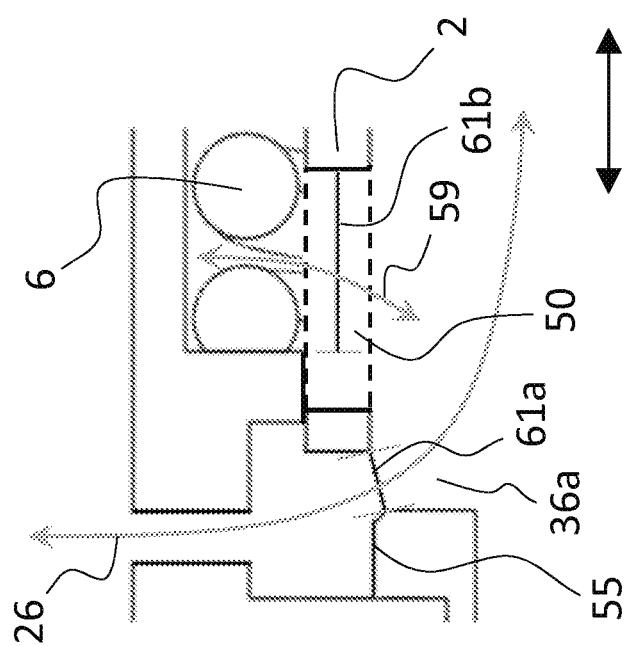

MULTI-PATH FLUID DIVERTER VALVE

CROSS REFERENCE TO RELATED APPLICATIONS

This application is a national stage filing under 35 U.S.C. §371 of international application number PCT/US2014/027389, filed Mar. 14, 2014 which claims the benefit of priority under 35 U.S.C. 119(e) to U.S. provisional application Ser. No. 61/789,600, titled "ACTIVE SUSPENSION," filed Mar. 15, 2013, U.S. provisional application Ser. No. 61/815,251, titled "METHOD AND ACTIVE SUSPENSION," filed Apr. 23, 2013, and U.S. provisional application Ser. No. 61/865,970, titled "MULTI-PATH FLUID DIVERTER VALVE," filed Aug. 14, 2013, each of which is hereby incorporated by reference in its entirety.

BACKGROUND

Field

Aspects relate to hydraulic valves for shock absorbers (dampers) that control fluid flow.

Discussion of Related Art

Simple passive dampers utilize restrictive valves that produce an exponential pressure drop as velocity increases. Modern passive dampers use multi-stage disc stacks to progressively open orifices as pressure increases. This has the effect of linearizing and even decreasing the slope of force response in the damper as velocity increases.

More complex semi-active dampers utilize fluid restriction mechanisms such as solenoid valves or a magnetorheological fluid to change the force response of the damper based on external inputs. In solenoid-based systems, durability is usually maintained by utilizing multi-stage blowoff valves in the piston head and base valves, which are commonly known in the art. These are generally pressure-activated valves that allow fluid flow to bypass the solenoid based on a fluid pressure.

Recent advances have led to the development of fully active suspensions that can push and pull the wheels of a vehicle in addition to providing damping. Such systems generally provide a substantial improvement in the ride and handling of cars and trucks. One approach to active suspension is with an electrohydraulic actuator that utilizes a damper body with a piston and piston head that separates a compression chamber and a rebound chamber. A hydraulic pump coupled to an electric motor is operatively coupled to the compression and rebound chambers. In such a system, a high damper velocity due to a wheel event such as a pothole hit may lead to extremely high rotational velocity of the hydraulic pump. In some cases this may be undesirable for durability and ride quality reasons. In the prior art, pressure-dependent blowoff valves have been used to limit RPM. These valves are relatively simple to construct and tune; however, they are only moderately effective in an active suspension because they are pressure activated and not fluid velocity (or volumetric flow rate) activated. During situations where the active suspension is controlled to be stiff, the velocity may be low but the pressure high, causing the blowoff to engage prematurely. Alternatively, where the active suspension is controlled soft, the velocity may be high but the pressure low, causing the blowoff to not engage while the pump is at high RPM.

SUMMARY

Aspects of a multi-path fluid diverter valve relate to a device to improve high-speed control of a hydraulic damper and provide tunable high velocity passive damping coefficients, herein called a diverter valve (DV).

According to one aspect, a diverter valve is used with a regenerative active or semi-active damper. In order to provide active damping authority with reasonable sized electric motor/generator and hydraulic pump/motor, a high motion ratio is required between damper velocity and motor rotational velocity. Although this may allow for accurate control of the damper at low to medium damper velocities, this ratio can cause overly high motor speeds and unacceptably high damping forces at high velocity damper inputs. To avoid this, passive valving can be used in parallel and in series with a hydraulic active or semi-active damper valve. In some embodiments a diverter valve may be used to allow fluid to freely rotate a hydraulic pump/motor up to a predetermined rotational velocity and then approximately hold the hydraulic motor at that predetermined rotational velocity, even as fluid flow into the diverter valve increases. In some embodiments a diverter valve may be used to allow fluid to freely rotate a hydraulic pump/motor up to a predetermined flow velocity into the hydraulic motor and then approximately hold the fluid flow velocity into the hydraulic motor at that predetermined fluid flow velocity, even as fluid flow into the diverter valve increases. The terms fluid velocity and flow velocity in this disclosure shall also include volumetric flow rate, which includes the amount of fluid flowing per unit time, given a fluid flow velocity and passage area.

According to one aspect, a diverter valve for a damper contains an inlet, a first outlet port, and a second outlet port. The diverter valve may have two flow modes/stages. In a free flow mode, fluid is able to pass freely from the inlet to the first outlet port of the diverter valve. This first outlet port may be operatively coupled to a hydraulic pump or hydraulic motor in an active suspension system. In a diverted bypass flow stage, the free flow is reduced by at least partially closing the first outlet port and at least partially opening the second outlet port that can operate as a bypass. In an active damper, this diverted bypass flow stage may allow fluid to flow between the compression and rebound chambers thereby bypassing the hydraulic pump/motor. According to this aspect, the transition from free flow mode to diverted bypass flow stage is primarily or completely controlled by the flow velocity of fluid from the inlet to the first outlet port (in some embodiments there may be a secondary pressure dependence). That is, in certain embodiments flow is diverted based on a measure of fluid velocity flowing toward the diverter valve independent of a measure of pressure of the fluid proximal (e.g. static pressure outside the diverter valve) to the diverter valve. In some embodiments an additional damping valve such as a digressive flexible disk stack is in fluid communication with the second outlet port such that fluid flowing through the second outlet port is then restricted before flowing into the compression or rebound chamber.

According to another aspect, a diverter valve for a damper comprises of a first port acting as a fluid flow inlet, a second port acting as a first outlet, and a third port acting as a second outlet. According to this aspect, a moveable sealing element (such as a valve), such as a sealing disk or spool valve moves through at least two positions. In a first position the sealing element provides fluid communication between the first port and the second port, and in a second position the sealing element provides fluid communication between the first port and the third port. During rest, a force element (such as a spring) pushes the moveable sealing element into the first position. In many cases it is desirable to apply a preload to the spring so that the moveable sealing element activates at a predetermined pressure drop generated by a predetermined flow velocity (or volumetric flow rate). A fluid restriction such as a small orifice is placed between the first port (high pressure) and the second port (low pressure) such that there is a pressure drop from the first port to the second port. The moveable sealing element may move in an axial direction and it contains a first side and an opposite second side that are perpendicular to the direction of travel (e.g. pushing on the first side will move the moveable sealing element into the second position, and pushing on the second side will move the moveable sealing element into the first position). The moveable sealing element may be configured such that the higher pressure first port is in fluid communication with the first side of the moveable sealing element, and the lower pressure second port is in fluid communication with the second side of the moveable sealing element. Since the pressure drop from the first port to the second port is a function of the fluid velocity through the diverter valve (such as through the moveable sealing element during the first mode), and with the areas exposed to fluid pressure of the first side and the second side being equal or roughly equal, the net force acting on the moveable sealing element is a function of fluid velocity through the valve which causes a pressure differential on the first and second sides of the moveable sealing element. By selecting a corresponding counteracting force element (such as a spring force), the valve may be tuned to switch modes at a particular fluid flow velocity (or volumetric flow rate). Depending on the accuracy of the selected counteracting force, precision of the particular fluid flow at which the valve switches may be established. As such, the valve may move into the second position when the pressure differential from the first side to the second side (the net pressure acting on the first side) of the moveable sealing element exceeds a first threshold. Furthermore, in some embodiments when the net pressure acting on the first side of the moveable sealing element drops below a second threshold, the moveable sealing element moves into a first mode. In many cases it may be desirable for the second threshold to be below the first threshold for reasons such as creating a hysteresis band to reduce valve oscillations. In some embodiments it is desirable to not completely cut off flow to the second port when the moveable sealing element moves to the second position. For these embodiments, while the diverter valve is in this second position some fluid is allowed to pass restricted from the first port to the second port. According to some aspects this diverter valve is used in a damper containing a hydraulic motor, wherein one port of the hydraulic motor is connected to the second port of the diverter valve, with the third port bypassing the hydraulic motor to the opposite port of the hydraulic motor. In such situations, it is sometimes desirable to keep the hydraulic motor spinning when the moveable sealing element is in the second position, which may be provided from a small restricted fluid path from the first port to the second port even while the moveable sealing element is in the second position bypassing the hydraulic motor. According to another aspect, the moveable sealing element may pass through more than two discrete states, such as a linear regime where both the first position and the second position are partially activated, allowing partial fluid flow from the first port to both the second port and the third port generally proportional to the moveable sealing element's position. There are several embodiments of a diverter valve, and these may use several different types of moveable sealing elements including but not limited to sprung discs/washers, spool valves, poppet valves, and the like.

According to another aspect a diverter valve uses a moveable disc. A first (inlet) port and a second and third (outlet) outlet ports communicate fluid with the valve. The moveable disc has a first face and a second face and sits within a manifold. The manifold is configured such that fluid from the first port (the inlet) is allowed to communicate with the first face of the moveable disc such that a pressure in the first port acts on the first face of the disc. The diverter valve moves through at least two modes of operation: a first mode and a second mode. In the first mode, the valve is in a free flow mode such that fluid is allowed to communicate from the first (inlet) port through a first restrictive orifice at least partially created by the second face of the disc, and to the second (outlet) port. The restrictive orifice creates a pressure drop such that pressure on the second face is less than the pressure on the first face when fluid is flowing through the first restrictive orifice. A spring, optionally preloaded, creates a counteracting force holding the disc in the first mode unless the pressure differential from sufficient fluid flow velocity is attained to actuate the disc into the second mode. In the second mode, the disc at least partially seals the fluid path from the first port to the second port, and opens a fluid path from the first port to the third port. In some embodiments an additional second fluid restriction path exists between the first port and the second port to allow restricted fluid communication in both the first and the second modes. In some embodiments only part of the second face acts as an orifice or sealing land, with the rest of the second face area open to the pressure of the second port.

According to another aspect a diverter valve uses a radially-sealed spool valve as the moveable sealing element in a manifold. The valve comprises at least three ports: a first port, a second port, and a third port. A spool valve moves through at least two modes and contains an orifice through its axis and an annular area on the top and bottom. The orifice contains a first region comprising a first fluid restriction such as an hourglass taper in the bore, and may contain a second region with radial openings such as slotted cutouts that communicate fluid from the orifice to the outside diameter of the spool in a restricted fashion (the second restriction). This second restriction may be implemented in a number of different ways and is not limited to notches in the spool valve. For example, it may be implemented with passages or notches in the manifold. The functional purpose of this optional feature is to communicate fluid from the first port to the second port in a restricted manner in either the first or second mode. During the first mode, fluid may escape through the orifice and through an annular gap about the valve into the second port (a large opening). The spool valve has an outside diameter (OD) in which at least a portion of the OD surface area acts as a sealing land. This sealing land may be perpendicular to the axis of travel of the spool, that is, if the spool moves about the z-axis, the sealing land is on a circumference in the xy plane. In some embodiments such a sealing configuration prevents fluid from flowing in the z direction. The sealing land on the OD of the spool valve substantially creates a seal that blocks flow from the first port to the third port when in the first mode. A force element such as a spring biases the spool valve into the first mode. When in the first mode, fluid may flow through the spool valve orifice, being constricted by the first restriction, and then discharges into the second port through a large opening. When fluid flow velocity through the first restriction exceeds a threshold, the pressure differential between the first port acting on the annular area of one side of the spool valve, and the second port acting on the opposite annular area side of the spool valve, creates a net force greater than the force element and moves the spool into, or toward, the second mode. When in the second mode, the radial sealing land may open, allowing fluid flow from the first port to the third port. Additionally, during the second mode, restricted fluid may flow through the second restriction from the first port to the second port. By sealing radially and setting both annular areas to be roughly equal, the valve will switch from the first mode to the second mode solely based on fluid flow (not ambient system pressure). In this embodiment, the seal creates a pressure gradient during the first mode from the first port to the third port, wherein the pressure gradient acts perpendicular to the direction of valve travel.

According to another aspect, an active damper is comprised of separate rebound and compression diverter valves in order to limit high-speed operation of a coupled hydraulic pump. These diverter valves may be constructed using a number of different embodiments such as with a face sealing disc, a radially sealing spool valve, or other embodiments that provide diverter valve functionality. The active damper may contain one or two diverter valves, and these may be the same or different physical embodiments. Further, diverter valves can be used in monotube, twin-tube, or triple-tube damper bodies that have either mono-directional or bidirectional fluid flow. In some embodiments the hydraulic pump is in lockstep with the damper movement such that at least one of compression or rebound movement of the damper results in movement of the hydraulic pump. In some embodiments, the hydraulic pump is further coupled to an electric motor. The hydraulic pump and electric motor may be rigidly mounted on the damper, or remote and communicate via devices such as fluid hoses. The diverter valve may be integrated into the damper across a variety of locations such as in the active valve, in the base assembly, in the piston rod seal assembly, or in the piston head. In some configurations the damper may be piston rod up or piston rod down when installed in a vehicle. The damper may further comprise a floating piston disposed in the damper assembly. In some embodiments the floating piston is between the compression diverter and the bottom mount of the damper assembly.

According to another aspect, a method in an active suspension for transitioning from a free flow mode where fluid flows into a hydraulic motor or pump, to a diverted bypass flow mode where fluid is allowed to at least partially bypass the hydraulic motor or pump, is disclosed. A sealing element moves to switch from the free flow mode to the diverted bypass flow mode. In some embodiments the diverted bypass flow mode contains an additional flow path where some fluid still flows into the hydraulic motor or pump. In some embodiments this transition is controlled by fluid flow velocity. However, the multi-path fluid diverter valve methods and systems described herein are not limited in this regard and may be controlled by other parameters such as a hybrid of fluid flow velocity and pressure, digitally using external electronics, or otherwise.

According to another aspect, a method comprising controlling a rotational velocity of a hydraulic motor by diverting fluid driving the motor with a passive diverter valve between the motor and at least one of a compression and a rebound chamber of an active suspension damper based on a measure of fluid velocity flowing toward the diverter valve independent of a measure of pressure of the fluid proximal to the diverter valve.

Aspects of the multi-path fluid diverter valve methods and systems described herein are may be beneficially coupled with a number of features, especially passive valving techniques such as piston-head blowoff valves, flow control check valves, and progressive or digressive valving. Many of the aspects and embodiments discussed may benefit from controlled valving such as flexible or multi-stage valve stacks further restricting fluid exiting the bypass port (herein referred to as the third port).

A diverter valve for use in improving high-speed control of a hydraulic regenerative active or semi active suspension system that uses an electric motor to regulate hydraulic motor RPM, such as described herein may be combined with progressive valving (e.g. multi-stage valving) with or without flexible discs; a fluid diverter, such as a rebound or compression diverter or blow-off valve; a baffle plate for defining a quieting duct for reducing noise related to fluid flow, and the like; flexible disks; electronic solenoid valves; and the like. In an example, a diverter valve may be configured as depicted at least in FIGS. 1-18.

The active/semi-active suspension system described throughout this disclosure may be combined with amplitude dependent passive damping valving to effect diverter valve functionality, such as a volume variable chamber that varies in volume independently of a direction of motion of a damper piston. In an example, diverter valve functionality may be configured as a chamber into which fluid can flow through a separating element that separates the variable volume chamber from a primary fluid chamber of the damper. The variable volume chamber further includes a restoring spring for delivering an amplitude-dependent damping force adjustment, which facilitates changing the volume of the variable volume chamber independently of the direction of movement of a piston of the suspension system.

The methods and techniques of diverter valving may be beneficially combined with various damper tube technologies including: dual and triple-tube configurations, McPherson strut; deaeration device for removing air that may be introduced during filling or otherwise without requiring a dedicated air collection region inside the vibration damper; high pressure seals for a damper piston rod/piston head; a low cost low inertia floating piston tube (e.g. monotube); and the like.

The methods and techniques of diverter valving may be beneficially combined with various accumulator technologies, including: a floating piston internal accumulator that may be constrained to operate between a compression diverter or throttle valve and a damper body bottom; an externally connected accumulator; accumulator placement factors; fluid paths; and the like.

The methods and techniques of diverter valving may be beneficially combined with various aspects of integration technology including: strut mounting; inverted damper configurations; telescoping hydraulic damper that includes a piston rod axially moveable in a pressure tube which is axially moveable in an intermediate tube; air spring configurations, McPherson strut configurations and damper bodies, self-pumping ride height adjustment configurations, thermally isolating control electronics that are mounted on a damper body to facilitate operating the control electronics as an ambient temperature that is lower than the damper body; airstream mounting of electronics; mounting smart valve (e.g. controller, hydraulic motor, and the like) components on a shock absorber; flexible cable with optional modular connectors for connecting a smart valve on a standard configuration or inverted damper to a vehicle wiring harness; direct wiring of power electronics from externally mounted power switches to an electric motor in the smart valve housing; directly wiring power electronics within the smart valve housing from internally mounted power switches disposed in air to an electric motor/generator disposed in fluid; fastening a smart valve assembly to a damper assembly via bolted connection; and the like.

An active suspension system, such as the system described herein that incorporates electric motor control of a hydraulic pump/motor, may benefit from a diverter valve that may act as a safety or durability feature while providing desirable ride quality during high speed damper events. While an active suspension system may be configured to handle a wide range of wheel events, pressure buildup of hydraulic fluid may exceed a threshold beyond which components of the suspension system may fail or become damaged. Therefore, passive valving, such as a diverter valve or a blow-off valve, and the like may be configured into the hydraulic fluid flow tubes of the suspension system.

The methods and techniques of diverter valving may be combined with valving techniques and technologies including progressive valving, disk stacks (e.g. piston head valve stacks), amplitude-specific passive damping valve, proportional solenoid valving, adjustable pressure control valve limits, curve shaping, and the like in an active/semi-active suspension system to provide benefits, such as mitigating the effect of inertia, noise reduction, rounding off of damping force curves, gerotor bypass, improved blowoff valve operation, and the like.

In active vehicle suspension systems comprising passive valving schematically placed in parallel or in series with a hydraulic pump/motor, it may be desirable to use a common valve that limits the maximum speed at which the hydraulic pump/motor rotates, regardless of hydraulic flow rate, while it simultaneously limits and/or controls the damping force at high hydraulic flow rates during high speed suspension events.

The present multi-path fluid diverter valve methods and systems described herein are not limited to vehicle dampers. According to another aspect, a diverter valve is used in a generic hydraulic system with a back-drivable fluid motor or pump. In such a system, the diverter valve protects the hydraulic motor or pump from rotating faster than specified when an external input on the system would otherwise cause the motor or pump to be back-driven too rapidly.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing, and some similar components may have different numbers. In the drawings:

FIG. 23 is a schematic of a section of the movable sealing element of a diverter valve (DV) and a section of the manifold assembly on which it seals that move with respect to one another during the transition between first and second modes.

FIG. 23A is a schematic that depicts a first positional instance during the transition of the DV between the first and second modes at which the effective fluid flow area between the two sections is substantially negligible.

FIG. 23B is a schematic that depicts a second positional instance during the transition of the DV between the first and second modes at which the effective fluid flow area between the two sections is substantial.

FIG. 23C is a schematic that depicts a third positional instance during the transition of the DV between the first and second modes at which the effective fluid flow area between the two sections is substantial and greater than the effective fluid flow area of the second positional instance.

FIG. 23D is a plot that depicts the effective fluid flow area between a section of the movable sealing element of a diverter valve (DV) and a section of the manifold assembly as a function of relative position of the two sections with respect to another.

FIG. 24 is a schematic of a section of the movable sealing element of a diverter valve (DV) that shows the interaction of the surfaces that form the first fluid flow restriction in the fluid flow path between the first and second ports.

FIG. 25 is a schematic of a section of the movable sealing element of a diverter valve (DV) and a section of the manifold assembly on which it seals, effectively forming a fluid cavity that stands in fluid communication with two fluid volumes through two separate fluid flow paths that move with respect to another during the transition between the first and second modes.

FIG. 25A is a schematic that depicts a first positional instance during the transition of the DV between the first and second modes at which the effective fluid flow area of the first of the two fluid flow paths between these two sections is substantially negligible and the effective fluid flow area of the second of the two flow paths is also substantially negligible.

FIG. 25B is a schematic that depicts a second positional instance during the transition of the DV between the first and second modes at which the effective fluid flow area of the first of the two fluid flow paths between these two sections is substantially negligible and the effective fluid flow area of the second of the two flow paths is also substantial.

FIG. 25C is a schematic that depicts a third positional instance during the transition of the DV between the first and second modes at which the effective fluid flow area of the first of the two fluid flow paths between these two sections is substantially negligible and the effective fluid flow area of the second of the two flow paths is also substantial and greater than the effective fluid flow area of the same flow path of the second positional instance.

FIG. 25D is a plot that depicts the effective fluid flow area in the second of the two fluid flow paths between a section of the movable sealing element of a diverter valve (DV) and a section of the manifold assembly on which it seals that effectively form a fluid cavity that stands in fluid communication with two fluid volumes through two separate fluid flow paths, as a function of relative position of the two sections with respect to another.

FIG. 26 is a schematic of a section of the movable sealing element of a diverter valve (DV) and a section of the manifold assembly on which it seals, effectively forming a fluid cavity that stands in fluid communication with two fluid volumes through two separate fluid flow paths, that move with respect to another during the transition between the first and second modes.

FIG. 26A that depicts a positional instance during the transition of the DV between the first and second modes at which the effective fluid flow area of the first of the two fluid flow paths between these two sections is substantially negligible and the effective fluid flow area of the second of the two flow paths is also substantial and independent of the relative position of the two sections with respect to another.

FIG. 26B is a plot that depicts the effective fluid flow area in the second of the two fluid flow paths between a section of the movable sealing element of a diverter valve (DV) and a section of the manifold assembly on which it seals on which it seals that effectively form a fluid cavity that stands in fluid communication with two fluid volumes through two separate fluid flow paths, as a function of relative position of the two sections with respect to another.

FIG. 27 is a schematic of the second flow restriction in the fluid flow path between the first and second ports of a spool type diverter valve (DV).

FIG. 27A is a schematic of an embodiment of the movable sealing element with radial openings that do not substantially contribute any additional fluid pressure force on the movable sealing element in its direction of travel.

FIG. 27B is a schematic of an embodiment of the movable sealing element radial openings that substantially contribute an additional fluid pressure force on the movable sealing element in its direction of travel.

FIG. 29 is a schematic that depicts a section view of the end of a spool type DV at the second flow restriction.

FIG. 29A shows the movable sealing element in the un-activated position, the first mode, such that the effective flow area at the second flow restriction is substantially large.

FIG. 29B shows the movable sealing element in an intermediate position between the first and second modes such that the effective flow area at the second flow restriction is substantially smaller than when the movable sealing element is in the first mode.

FIG. 29C shows the movable in the fully activated position, the second mode, such that the effective flow area at the second flow restriction is substantially negligible.

FIG. 30 is a schematic that depicts a section view of the end of a spool type DV at the second flow restriction.

FIG. 30A shows the movable sealing element in the un-activated position, the first mode.

FIG. 30B shows the movable sealing element in the activated position, second mode, wherein the spool end forms a radial seal with the sealing manifold at the second flow restriction.

DETAILED DESCRIPTION

Figure 1A:
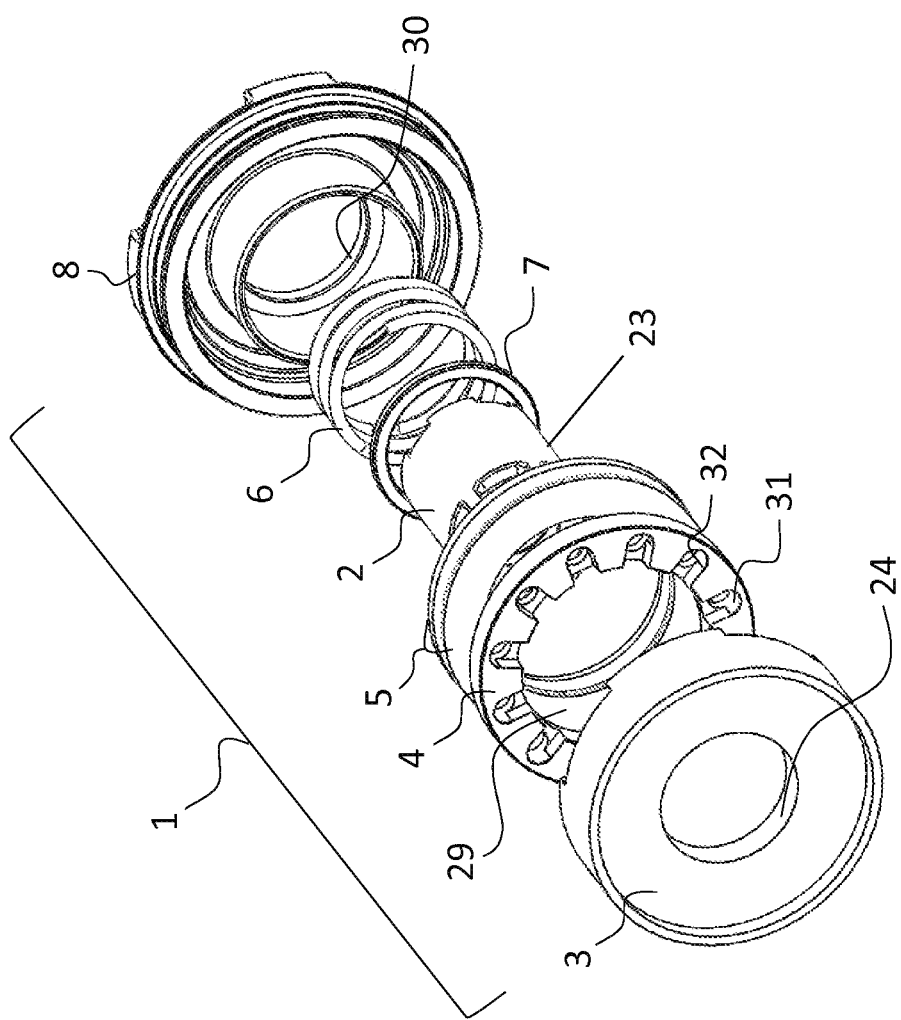
FIG. 1A is a spool type diverter valve (DV) assembly in an exploded view to show its main components—the spool, spool spring, blow off valve (BOV) spring stack, manifold plate and the valve support.

Some aspects of the system relate to a passive valve that contains a free flow mode and a diverted bypass mode in order to protect the hydraulic pump (including hydraulic motors) in a back-drivable hydraulic system from overspinning. Other aspects relate to velocity activated flow control valves that redirect fluid at a given flow rate. Other aspects relate to passive valving for use in an active suspension system for vehicles.

Generally, except where context indicates otherwise, references to a first port are synonymous with a first inlet or inlet port, a second port are synonymous with a first outlet or free flow port, and a third port are synonymous with a second outlet or bypass port, unless otherwise specified in particular embodiments herein.

Furthermore, the following is a list of definitions of relevant terms, specifically pertaining to but not limited to the descriptions of FIGS. 20 through 30. These definitions are intended to help the reader understand the terms used in the description of embodiments herein, and should not be considered to limit the terms. For example, the concept of the pair of effective projected pressure areas being substantially equal may simply mean that the two pressure areas are of roughly equal area, or other definitions that may suffice depending on the embodiment.

transition between modes encompasses, without limitation, the transition regime of the diverter valve as the movable sealing element moves from its first mode to its second mode.

(sealing) manifold assembly encompasses, without limitation, the various elements of the diverter valve assembly that are not part of the movable sealing element and that do not move with respect to another during the transition between the first and second modes.

assembly encompasses, without limitation, a grouping of physically connected parts. An assembly may include voids or passages that are fully or partially fluid filled and are created by the interaction of these solid components.

surface (area) encompasses, without limitation, an area of a part that is at least partially outlined by physical features of the component such as edges, holes, passages, etc.

all surfaces encompasses, without limitation, a number of surfaces that combined make up all the surfaces responsible for forming a volume, such as a solid component, a cavity, a flow passage, etc.

section encompasses, without limitation, a portion of a surface area or of a volume that may not be outlined by any physical features. A section may also refer to entire parts, surfaces, or assemblies of several parts or surfaces. If a surface or volume is divided into several sections, each of these sections is unique such that no two sections share part of the same surface or volume.

all sections encompasses, without limitation, a number of sections that combined make up a full surface, or volume, or a combination of unique surfaces or volumes.

Functionally important sections are sections that may contain features that are at least partially responsible for forming a fluid passage, for forming an effective sealing surface with the movable sealing element, a section of the movable sealing element, a flow restriction etc. Several elements may share common features.

axial direction encompasses, without limitation, the direction of travel of the movable sealing element when transitioning between the first and second modes. In many embodiments of the diverter valve, the axial direction is collinear with the axis of rotational symmetry of the movable sealing element.

axial travel position encompasses, without limitation, the relative position of the movable sealing element with respect to its sealing manifold assembly. Also referred to herein as axial spool position for any embodiment of the spool type diverter valve.

transition stroke encompasses, without limitation, the path the movable sealing element describes as it travels between its first and second mode.

facing towards the first port encompasses, without limitation, an area is understood to face towards the first port if all axial components of the normal vectors of this surface point from the second to the first mode of the movable sealing element.

facing towards the second port encompasses, without limitation, an area is understood to face towards the first port if all axial components of the normal vectors of this surface point from the first to the second mode of the movable sealing element.

projected (fluid) pressure area encompasses, without limitation, the projection of a surface section of a component of the diverter valve assembly that is entirely exposed to fluid and entirely stands in primary fluid pressure communication with the same flow path, onto a plane that is perpendicular to the axial direction of travel of the movable sealing element. In the case where the surface section is entirely in contact with the fluid that entirely stands in primary fluid pressure communication with the same flow path or pressure level there are two possible opposing types of projected pressure areas: the first type that accounts for any surface regions of a given surface section that face towards the first port, and the second type that accounts for all surface regions of a given surface section that face towards the second port. Any regions of a surface section for which the axial component of their normal vectors is zero do not contribute to either of those two types of projected pressure areas. Special care is preferably taken to properly calculate the projected pressure areas of any surface section that is partially or fully exposed to any fluid volume that each respectively stand in primary fluid pressure communication with one or more fluid paths. In such cases, the projected pressure areas of such surface sections need to be determined separately, independently considering each of their surface sections that stand in primary fluid pressure communication with the same fluid path or pressure level. The resulting projected pressure areas cannot be easily combined into a single combined projected pressure area, or a pair of opposing combined projected pressure areas.

effective (projected) (fluid) pressure area encompasses, without limitation, the net resultant projected fluid pressure area of all the surface sections on a part in communication with a discrete flow path or a discrete fluid volume.

individual (fluid) flow passage encompasses, without limitation, the fluid filled chamber with a single fluid entry port and a single fluid exit port wherein the volume of fluid that that enters is equal to the volume of fluid that exits and there are no internal features that would cause the fluid volume to be split into multiple smaller fluid volumes within the confines of this chamber. effective (fluid)

flow passage encompasses, without limitation, a set of individual flow passages that combine to form a larger flow passage between a single entry flow port and a single exit flow port such that if a fluid volume was passed through this flow passage, it would split multiple smaller volumes and then combine into a single fluid volume within the confines of the chamber before passing through the single exit flow port.

(fluid) flow path encompasses, without limitation, the path travelled by a fluid volume through a flow passage that is equal to the set of paths that a substantial portion of the fluid volume describes as it passes through the set of all individual flow passages between its entry and exit flow ports of an effective fluid passage.

main (fluid) flow path encompasses, without limitation, the first path that leads from the first port to the second port, or the second main flow path that leads from the first port to the third port. The first main flow path is active in the first mode of the diverter valve and in some embodiments also in the second mode as well as during the transition between the first and second modes. The second main flow path is only active during the second mode and, in some embodiments of the diverter valve, to a varying extent during the transition between the first and second modes.

main (fluid) flow passage encompasses, without limitation, the two flow passages that create the two main flow paths within the diverter valve assembly.

wetted area encompasses, without limitation, a section of a surface that is fully in contact with fluid.

effective (fluid) flow area of an individual flow passage encompasses, without limitation, the effective flow area of an individual flow passage at any point along the flow path between its entry and exit ports which is equal to the minimum wetted area projected on a plane that passes through this point such that the plane is perpendicular to the direction of the flow path effective (fluid) flow area encompasses, without limitation, the effective flow area of a flow passage at any point along the flow path between its entry and exit ports which is equal to the sum of the effective flow areas of the individual flow passages that form the effective flow passage at this point.

(fluid) flow restriction encompasses, without limitation, a section of a flow passage along the flow path wherein the effective flow area of the fluid path is smaller than the effective flow area of the fluid path in a section immediately before or after this section of the flow passage. Flow restrictions with smaller effective flow areas, longer sections of flow constriction, or that experience fluid passing through at higher rates of flow generally affect more substantial changes in fluid pressure between their entry and exit ports and are called more restrictive.

substantial (fluid) flow restriction encompasses, without limitation, a section of a flow passage along a flow path wherein the flow passage is substantially more restrictive than the section of the flow passage immediately before or after the section. The change in pressure across a substantial flow restriction may substantially account for the overall change in pressure between the entry and exit ports of the flow path.

fluid chamber encompasses, without limitation, a section of a flow passage that either lies between two substantial fluid flow restrictions, between the entry port and a first substantial flow restriction, or between a final substantial flow restriction and the exit port. If there is no substantial flow restriction along a flow passage, the entire flow passage may also be considered a fluid chamber.

fluid (pressure) communication encompasses, without limitation, a flow passage between a fluid cavity and a main flow passage or a substantial flow restriction within a main flow path of the diverter valve. In some embodiments it also encompasses, without limitation, fluid flow passages between functional elements. In such embodiments, the flow path between the first and second ports can also be referred to as the fluid communication path the between the first and second ports.

primary fluid (pressure) communication path encompasses, without limitation, any fluid chamber or cavity that shares at least one surface section with the movable sealing element that has at least two fluid pressure communication paths. In some fluids chamber or cavities of this type, at least one of the fluid pressure communication paths has a substantially larger effective fluid flow area than the others. Any such fluid pressure communication paths are also called primary fluid communication paths.

first (fluid) flow restriction encompasses, without limitation, an embodiment of a substantial flow restriction in which, for most embodiments of the diverter valve, it encompasses, without limitation, the only substantial flow restriction along the main flow path between the first and second ports during the first mode.

effective annular (fluid) pressure area encompasses, without limitation, in several embodiments of the diverter valve, the main flow path between the first and second ports includes a central opening at the center of a rotationally symmetric movable sealing element. In some of these embodiments, the first flow restriction between the first and second ports is at least partially formed by the surfaces at or near the inner diameter of the movable sealing element wherein the effective projected pressure area of the movable sealing element is sometimes referred to as the effective annular pressure area of the spool.

net (fluid) pressure force encompasses, without limitation, the sum of all fluid pressure forces acting on all sections of a surface, a combination of sections, the entirety of a surface of a solid component, or of an element. Generally referring to the sum of fluid pressure forces acting on at least a small surface section of the movable sealing element in the direction of travel of the movable sealing element when transitioning between the first and second modes.

net (external) force encompasses, without limitation, the sum of all external forces of a related type acting on all sections of a surface, on a combination of sections, on the entirety of a surface of a part, or element. Generally referring to the sum of all forces of that same related type acting on at least a small surface section of the movable sealing element in the direction of travel of the movable sealing element when transitioning between the first and second modes.

net force balance encompasses, without limitation, the sum of all substantial external forces acting on a part or an assembly within the diverter valve assembly. The types of external forces considered for this net force balance generally include any net pressure forces acting on the part or assembly, any biasing forces such as forces due to any number of compressed spring elements, inertial forces due to acceleration, gravity etc. In most contexts herein, a net force balance encompasses, without limitation, the sum of all substantial external forces acting on the movable sealing element in the direction of travel of the movable sealing element when transitioning between the first and second modes.

variably damped encompasses, without limitation, the situation where the damping level of an element experiences varies throughout its motion. In most contexts herein, variably damped encompasses, without limitation, position dependent damping of the movable sealing element such that at any two positions during its transition stroke between the first and second modes, there can be different levels of damping.

smooth pressure response encompasses, without limitation, a characteristic change in the differential pressure between any combination of the three main flow ports of the diverter valve during the transition between the first and second modes as compared to just before entering and immediately after exiting that transition mode. A pressure response between two of these ports can be considered smooth if the change in differential pressure across these two ports with respect to time during the dynamic transition between the first and second mode is similar to the change in differential pressure across the same two ports with respect to time immediately before or immediately after entering the transition mode. In the case where multiple diverter valves are used in combination with multiple dampers, a smooth pressure response can refer to a force response of at least one of the dampers during the transition of any of the diverter valves that are part of that system such that the change in force with time immediately before and immediately after the transition between modes of the diverter valve is similar to the change in force with time during the transition of modes of that diverter valve.

Figure 1B:
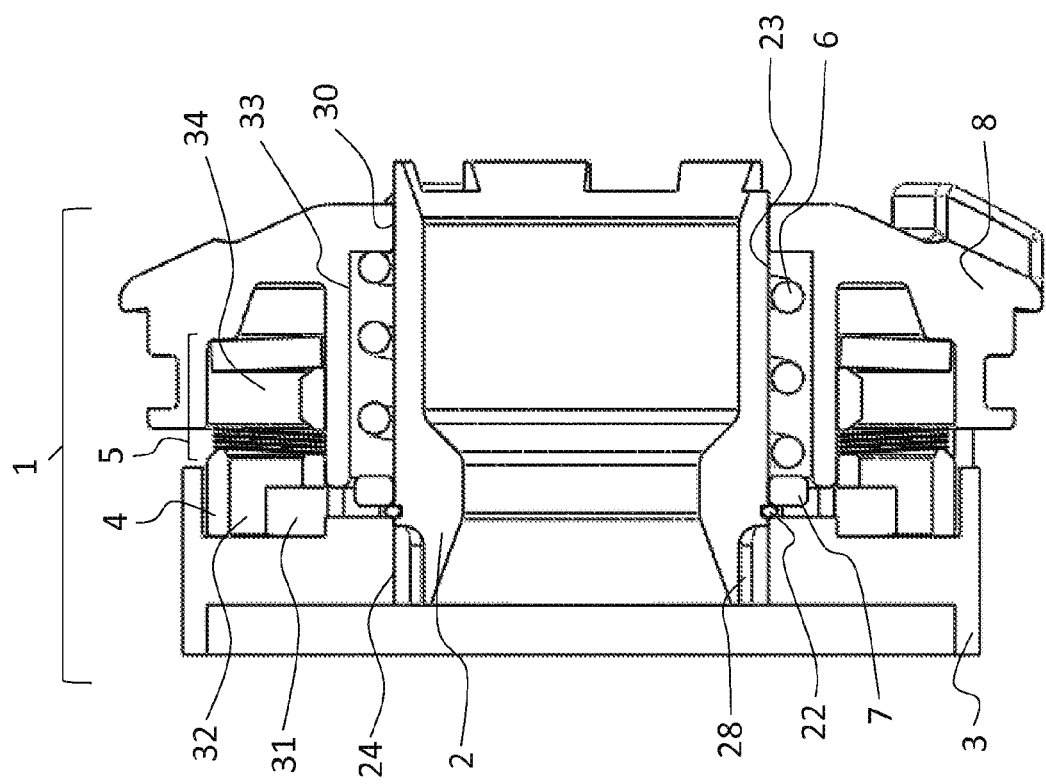
FIG. 1B is a spool type DV assembly in an assembled view to show its main components: the spool, spool spring, BOV spring stack, manifold plate the valve support, the BOV cavity and the Spring Cavity.

Regarding FIGS. 1A and 1B, a spool type compression diverter valve (CDV) assembly 1 with radial sealing is disclosed.

CDV 1 consists of a valve support 8, a spool valve 2, a valve seal plate 3, a manifold plate 4, a blow off valve (BOV) assembly 5, a valve spring 6, a spring support 7, and a snap ring 22 (the valve support 8 and the manifold plate 4, collectively a manifold). The spring support and snap ring can be manufactured as an integral part of the spool valve 2, and the multi-path fluid diverter valve methods and systems described herein are not limited in this regard.

In FIG. 1B the same spool type embodiment of a compression diverter valve 1 is shown in the assembled state.

The valve support 8 locates the manifold plate 4, via the bore 29 of the manifold plate 4, thereby ensuring that the axis of the manifold plate 4 is co-axial with the axis of the valve support 8. The manifold plate 4 in turn locates the seal plate 3 via the same bore 29, thereby ensuring that the axis of the manifold plate 4 is co-axial with the axis of the seal plate 3. The manifold plate 4 is axially located against the seal plate 3 by the BOV stack 5 that is sandwiched between the valve support 8 and the manifold plate 4 with a pre-load. The BOV stack 5 could be in the form of a damping valve such as a digressive flexible disk stack. The BOV stack 5 creates a BOV cavity 34. The spool valve 2 is located between the bore 30 of the valve support 8 and the bore 24 of the seal plate 3. In the free state, the spool valve 2 is held in the 'un-activated' free flow mode, i.e. the first mode, position with a force element, here a pre-load by means of the valve spring 6 creating, a closing force against the spring support 7, and snap ring 22 that is positively held in the spool valve 2. The said spring force reacts against the valve support 8 so that the snap ring 22 is held firmly against the seal plate 3. The manifold plate 4 contains a plurality of passages 31 disposed around the bore 29 of the manifold plate 4 that are on fluid communication with a plurality of holes 32 that are placed in the manifold plate 4, so that there is fluid communication between the bore 29 of the manifold plate 4 and the faces of the manifold plate 4. The valve spring 6 is located in a spring cavity 33 in the valve support 8. The spring cavity 33 is in fluid communication with the bore 29 of the manifold plate 4, and hence the passages 31 and holes 32 in the manifold plate 4. The BOV assembly 5 blocks fluid flow from the holes 32 in the manifold plate and the BOV cavity 34 until a predetermined pressure differential is reached, this being the BOV cracking pressure. The flow/pressure characteristic of the BOV assembly 5 being tuned to a specific curve, this curve may be a digressive curve. The BOV assembly 5 may act as a check valve and block fluid flow from the BOV cavity 34 to the holes 32 in the manifold plate 4 regardless of the pressure in the BOV cavity 34. An orifice may be placed between the BOV cavity 34 and the spring cavity 33 so that the pressure between the BOV cavity 34 and the spring cavity 33 will equalize, if there is no or little flow between them.

As the spool valve 2 strokes toward the activated position, the spring support 7 moves in the bore that forms the spring cavity 33 of the valve support 8, displacing fluid from the spring cavity. The outside diameter of the spring support 7 may be a close fit to the spring cavity bore to restrict flow of the displaced fluid, thereby damping the motion of the spool valve. The fluid restriction may be sized so as to dampen any spool valve oscillations that may occur during its operation while not adversely affecting the response of the spool valve. The spring support 7 may be a separate component as shown, or may be formed as an integral part of the spool valve 2. The fluid restriction may be in the form of an annular gap between the outside diameter of the spring support 7 and the bore of the spring cavity 33, or by a slot or notch etc. that is formed into the spring support 7.

Figure 2:
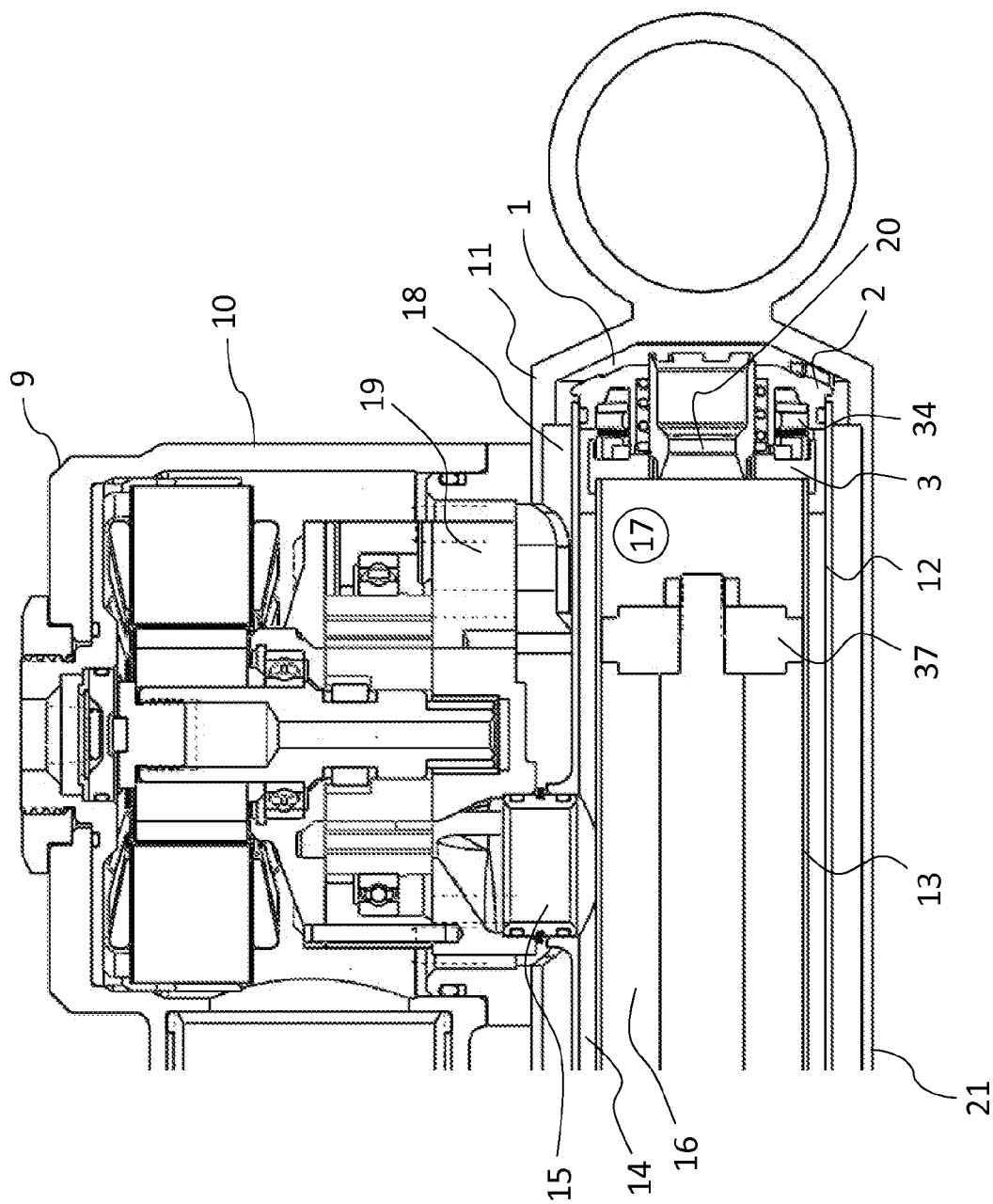
FIG. 2 depicts an active damper with a DV assembly in the compression chamber that is used to limit the speed of the of the hydraulic pump/motor and electric generator at high damper compression velocities; wherein the diverter valve comprises of a spool type valve that uses the spool outer diameter to seal between the compression chamber and the blow off valve (BOV) cavity.

In FIG. 2, a regenerative active/semi active damper 9 that consists of a hydraulic regenerative, active/semi active damper valve 10, and a pressure charged triple-tube damper assembly 21, containing an embodiment of a compression diverter valve 1, is shown.

The valve support 8 is held concentric to the damper body 11 and locates the damper middle tube 12. The seal plate 3 locates the damper pressure tube 13, and creates a first annular flow passage 14 that is in fluid communication with the first port 15 of the hydraulic pump/motor of the hydraulic valve 10 and the rebound chamber 16. The first annular flow passage 14 is also in fluid communication with the BOV cavity 34. The seal plate 3 caps off the compression chamber 17. The middle tube 12 seals on the valve support 8, and creates a second annular flow passage 18 that is in fluid communication with the second port 19 of the hydraulic pump/motor of the hydraulic valve 10 and the compression chamber 17 via the concentric orifice through its axis 20 in the spool valve 2. While the orifice is called a concentric orifice, the invention is not limited to orifices that travel through the center. It may be offset, skewed, and other suitable shapes, sizes, and locations. Concentric in this disclosure typically means it is contained within a moveable sealing element irrespective of specific location within.

A piston 37 is disposed in the pressure tube so as to create a first chamber and a second chamber, wherein the first chamber is the rebound chamber 16 and the second chamber is the compression chamber 17.

Figure 3:
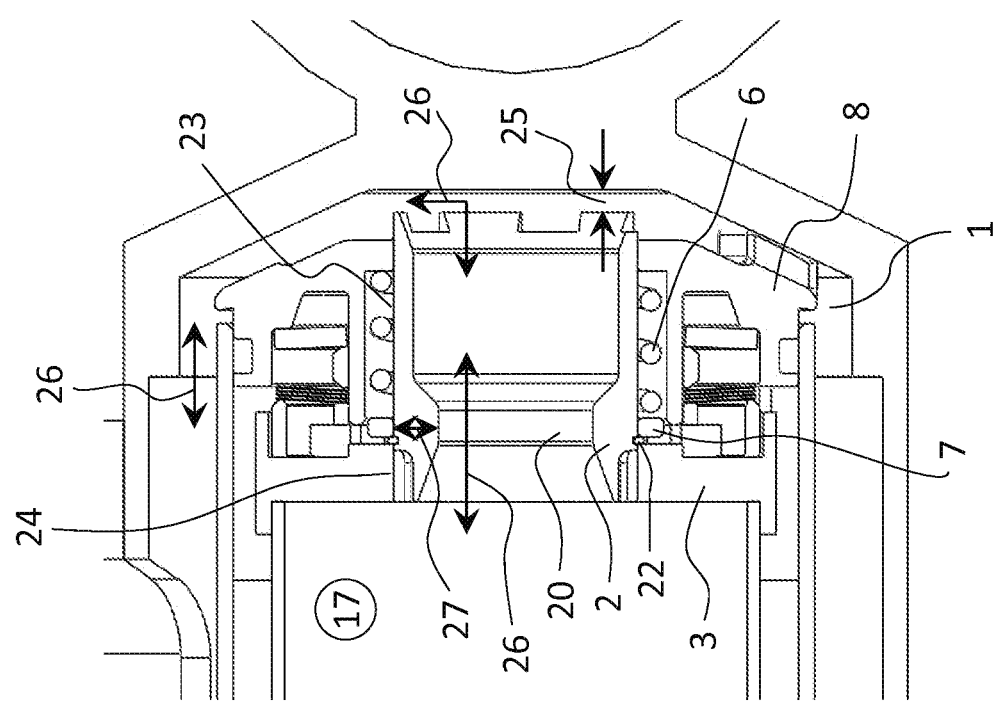
FIG. 3 depicts a spool type DV located in the compression chamber of an active damper in the closed (un-activated) position—such that fluid flow is blocked from the compression chamber to the BOV chamber.

Referring to FIG. 3, a compression diverter valve in the 'un-activated' position is shown.

In the position shown in FIG. 3, the spool valve 2 is held in the 'un-activated' first mode position by the pre-load of the valve spring 6, and when in this position the full uninterrupted outside diameter 23 of spool valve 2 is located within the bore 24 of the seal plate 3, the diametrical clearance between the full outside diameter 23 of spool valve 2 and the bore 24 of the seal plate 3 is such that any appreciable fluid flow from the compression chamber 17 is blocked from passing through the bore 24 of the seal plate 3. Fluid can flow from the compression chamber 17 through a first port that is defined by the bore 24 of the seal plate 3, through the concentric orifice 20 of spool valve 2, through a second port, the annular gap 25 that exists between the end of the spool valve 2 and the damper body 11, into the second annular flow passage 18 and hence into the second port 19 of the hydraulic pump/motor of the hydraulic valve 10, and vice versa as shown by flow arrows 26. Whereby the concentric orifice 20 creates a first fluid restriction.

As fluid flows from the compression chamber 17 through the concentric orifice 20 of spool valve 2 to the second port 19 of the hydraulic pump/motor of the hydraulic valve 10, a pressure drop is created that acts upon the projected area 27 of the spool valve 2 to create a net axial force on the spool that opposes the force from the valve spring 6. The force generated by the said pressure drop is proportional only to the said fluid flow from the compression chamber 17 to the second port 19 of the hydraulic pump/motor of the hydraulic valve 10, and is unaffected by any pressure differential that may exist between the compression chamber 17 and the rebound chamber 16. The spool valve 2 will remain in the un-activated first mode position until the said net axial force acting on the spool valve 2 from the said pressure drop generated by the fluid flow from the compression chamber 17 to the second port 19 of the hydraulic pump/motor of the hydraulic valve 10, is equal to that of the force from the said pre-load from the valve spring 6. Once the said net axial force becomes greater than the force from the said pre-load, then the spool valve will move away from the seal plate 3 toward the valve support 8, thereby reducing the annular gap 25.

If there is no flow from the compression chamber 17 to the second port 19 of the hydraulic pump/motor of the hydraulic valve 10, then no said net axial force will occur, regardless of any pressure differential that may exist between compression chamber 17 and the rebound chamber 16, and the valve will remain in the un-activated first mode position. This is due to the fact that with no flow, the force from fluid pressure acting on both sides of the moveable spool valve 2 may be configured to be approximately equal and opposite.

When there is fluid flow from the second port 19 of the hydraulic pump/motor of the hydraulic valve 10 to the compression chamber 17 via spool valve 20, then a pressure drop is created that acts upon the projected area 26 of the spool valve 2 to create a net axial force on the spool that is complimentary to the force from the valve spring 6 and will ensure that the spool valve 2 will remain in the un-activated first mode position.

The diametrical clearance between the full outside diameter 23 of spool valve 2 and the bore 30 of the valve support 8 is such that any appreciable fluid flow from the spring chamber 33 to the annular gap 25, and vice versa, is blocked.

Figure 4:
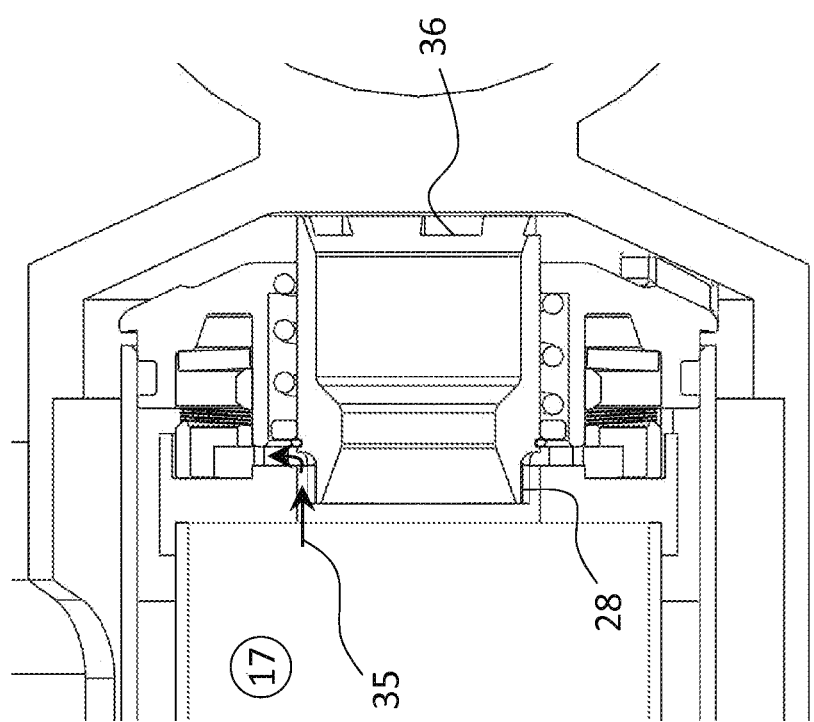
FIG. 4 depicts a spool type DV located in the compression chamber of an active damper in the open (activated) position—such that fluid can flow from the compression chamber to the BOV chamber by-passing the active valve hydraulic pump/motor.

Referring to FIG. 4, a CDV in the 'activated', second mode, diverted bypass position is shown.

When there is sufficient flow from the from the compression chamber 17 to the second port 19 of the hydraulic pump/motor of the hydraulic valve 10, the said pressure drop will generate a sufficient net axial force to move the spool valve 2 toward a second mode position so that fluid flows from the first port to a third port that is created by the flow notches 28, that are disposed around the outside of the valve spool diameter 23. This will generate a fluid passage from the compression chamber 17 through the bore 24 in the seal plate 3 to the spring cavity 33, as shown by flow arrows 35. Fluid can now flow from the compression chamber 17 through the bore 24 in the seal plate 3 to the spring cavity 33 into the passages 31 and holes 32 in the manifold plate 4. If the differential between the pressure in the holes 32 and the pressure BOV cavity 34 is greater than the said predetermined cracking pressure of the BOV assembly 5, then there will be fluid flow from the holes 32, and hence the compression chamber 17, and the BOV cavity 34, and hence the rebound chamber 16, creating a by-pass flow. As the valve spool 2 moves to the second mode position, the annular gap 25 will decrease and the flow from the compression chamber 15 to the second annular flow passage 18, and hence the second port 19, will become restricted. A predetermined flow rate from the from the compression chamber 17 to the second port 19 of the hydraulic pump/motor of the hydraulic valve 10, will generate a sufficient net axial force to move the spool valve fully to the activated state (a diverted bypass second mode) whereby the annular gap 25 is fully closed, then flow from the compression chamber 17 to the second port 19 of the hydraulic motor will be forced to flow through the small passages 36 that exist in the end of the valve spool 2. In some embodiments the annular gap 25 may only partially close during the activated state in order to allow additional flow from the compression chamber 15 to the second port of the hydraulic motor 19. The passages 36 will then create a second fluid restriction from the compression chamber 17 to the second port 19. The flow restriction of the passages 36 and the pressure/flow characteristic being such that when the said predetermined flow rate from the compression chamber 17 to the second port 19 is reached and the valve spool fully activates to the second mode, the flow from the compression chamber 17 to the second port 19 will remain mostly constant at this predetermined value, and any additional fluid flow from the compression chamber 17 will now pass through the valve spool 2 via the notches 28, through the BOV assembly 5 and hence to the rebound chamber 16, by-passing the second port 19 of the hydraulic pump/motor of the hydraulic valve 10. In this state, the pressure differential between the compression chamber 17 and the rebound chamber 16 is now a function of the flow through the BOV assembly 5, and the pressure/flow curve of the BOV assembly 5. In some embodiments, this BOV functionality may be eliminated to allow free passage or an alternative restriction to the rebound chamber 16.

In this activated second mode state, the CDV will now limit the flow to, and hence the speed of, the hydraulic regenerative, active/semi active damper valve 10, and the damping force generated being controlled passively by the pressure/flow curve of the BOV assembly 5, thereby protecting the regenerative, active/semi active damper valve 10 from overspeeding during high speed compression damper events.

Although this embodiment refers to a compression diverter valve it is anticipated that the damper may have a similar valve in the rebound chamber so as to offer protection from overspeeding during high speed rebound damper events, and the multi-path fluid diverter valve methods and systems described herein are not limited in this regard.

Figure 5:
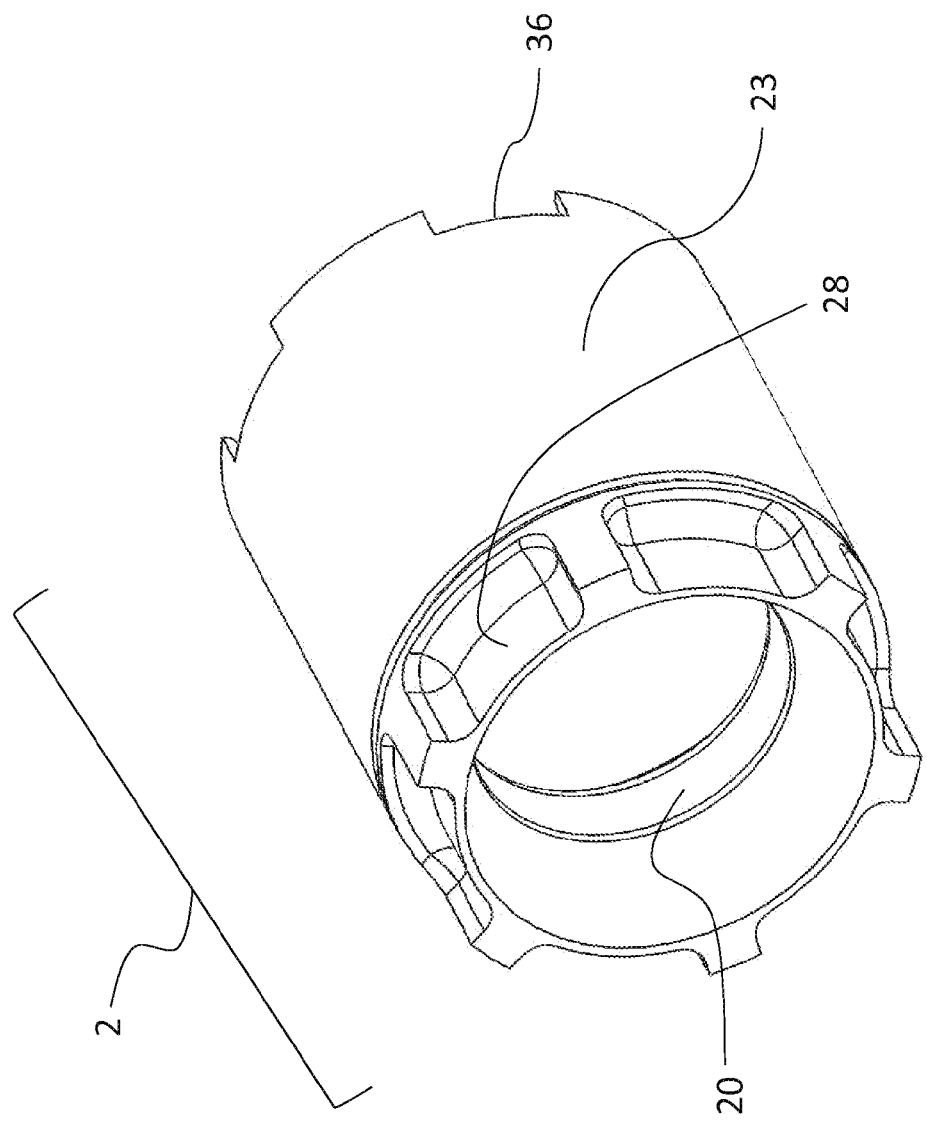
FIG. 5 depicts the spool valve to show the flow notches in its outer diameter that allow flow across the diverter valve to the BOV cavity when the valve is activated.

Referring to FIG. 5, the spool valve 2 is shown in detail to show the flow notches 28 and the flow passages 36.

The flow notches 28 in the spool valve 2 can be positioned and sized so that fluid flow can only occur between the compression chamber 17 and the spring cavity 33 once a predetermined annular gap size 25 is achieved. The rate at which fluid can flow between the compression chamber 17 and the spring cavity 33 with reference to spool position can be accurately controlled by the shape of the notches and/or by staggering the number of notches that become active with spool position, so as to modulate and smooth the action of the spool valve 2 as it transitions from the un-activated first mode state to the activated state second mode. This will smooth out any force spikes that may occur due to the transition between these states.

Figure 6:
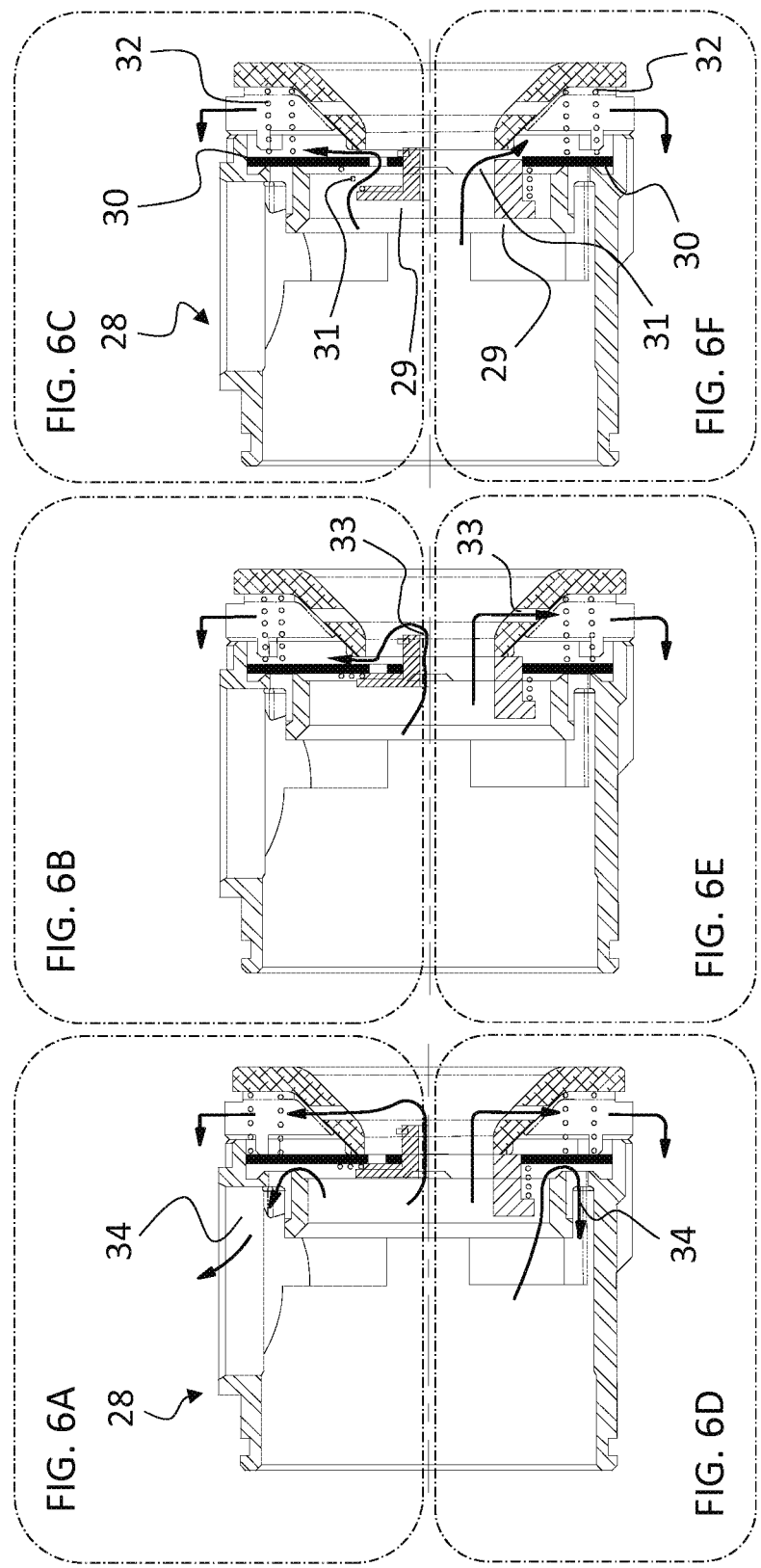
FIG. 6 depicts a moveable disk type DV with multi-stage activation.

FIG. 6 shows a diverter valve arrangement with multi-stage activation. FIGS. 6A through c show diverter valve operation that is comparable to FIGS. 6D through 6E, however, via a different embodiment. The basic diverter operation of the embodiment of FIG. 6 is substantially the same as described previously, however, the operation from free-flow mode to diverted mode occurs in stages.

In FIGS. 6C and 6F the diverter valve 28 is in the first mode and flow from either the compression chamber (or rebound chamber) flows through the first port, opening 31, into a second port (a first outlet port) 32. The opening 31 creates a first fluid restriction.

In FIGS. 6B and 6E when a predetermined flow rate is reached, the net force from the flow-induced pressure drop on the first stage valve 29 forces it closed against the spring 31. When the first stage valve 29 closes, flow can no longer pass through the first port, opening 31, and is forced through a second fluid restriction, orifice 33. This will limit the flow that can go to the second port.

In FIGS. 6A and 6D, after the first stage valve 29 is closed, the pressure in the compression chamber (or rebound chamber) will increase due to the restriction offered by the second restriction of orifice 33. This pressure will act upon the second stage valve 30, until the force generated by this pressure overcomes the force of the spring 32. The second valve stage will then open a third port (a second outlet port) 34 and the diverter valve will be in the second mode. This will allow bypass flow to go directly to the rebound chamber from the compression chamber (or vice versa) via the third port 34 bypassing the hydraulic pump/motor.

The force of springs 32 will determine at what pressure the second stage activates and can therefore be tuned to give the desired bypass damping force. Here, the second stage valve may comprise of a stack of flex discs arranged so that the pressure/flow curve can be further tuned to give the desired damping force curve. Several blowoff-valving techniques are known in the art beyond flex disks, and any may suffice. It is oftentimes desirable to have passive damping control over these flow/pressure characteristics in order to perform functional tasks such as smoothing force slope transitions.

By selection of the correct spring forces and spring rates of the springs 31 and 32, it is possible for the second stage valve to slightly open as the first stage closes to give a more progressive transition from the first to second stage operation if so desired.

It is also possible to use more valves and springs, in series or parallel, so as to offer three or more stages of operation.

Figure 7:
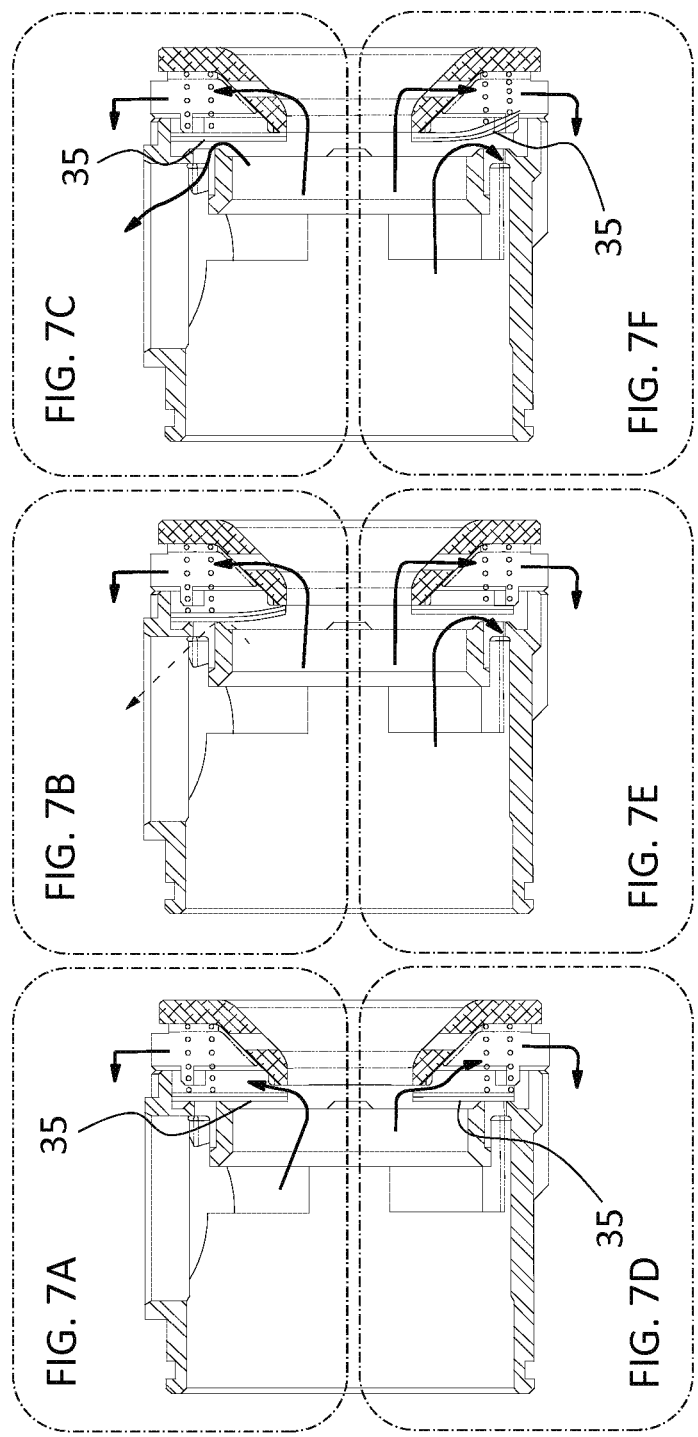
FIG. 7 depicts a moveable disk type DV with flexible disc based progressive damping during DV actuation.

FIG. 7 shows a diverter valve arrangement with flex disc activation. FIGS. 7A through c show DV operation that is comparable to FIGS. 7D through 7E, however via a different embodiment. The basic diverter operation of the embodiments in FIG. 7 is substantially the same as described in FIG. 6, however, the operation from free-flow mode to diverted mode now occurs in a smooth transition due to the flexure of the flex discs 35.

Figure 8:
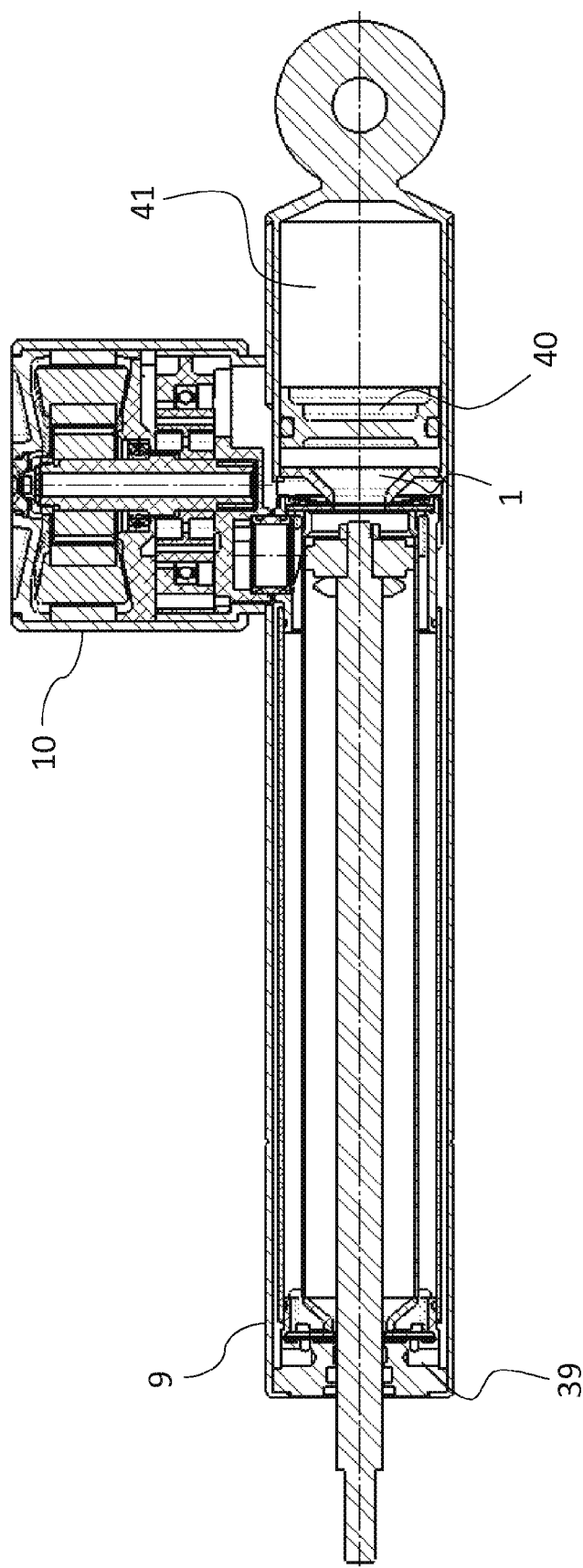
FIG. 8 depicts a Triple-tube active damper with internal accumulator and DV.

FIG. 8 shows a triple-tube active damper with an internal accumulator and face sealed disc embodiment of a diverter valve arrangement.

The triple-tube active damper consists of a damper assembly 9 and valve assembly 10 that is rigidly attached to damper assembly 9. The valve assembly 10 may contain an electric motor/generator controller that is rigidly attached to it so as to form an electronically controlled "smart valve."

The damper assembly 9 contains a rebound diverter assembly 39 and a compression diverter valve assembly 1. The accumulator floating piston (FP) 40 is located behind the compression diverter valve assembly 1, and the accumulator gas volume 41 is located behind the FP 40 ahead of the damper bottom mount.

Figure 9:
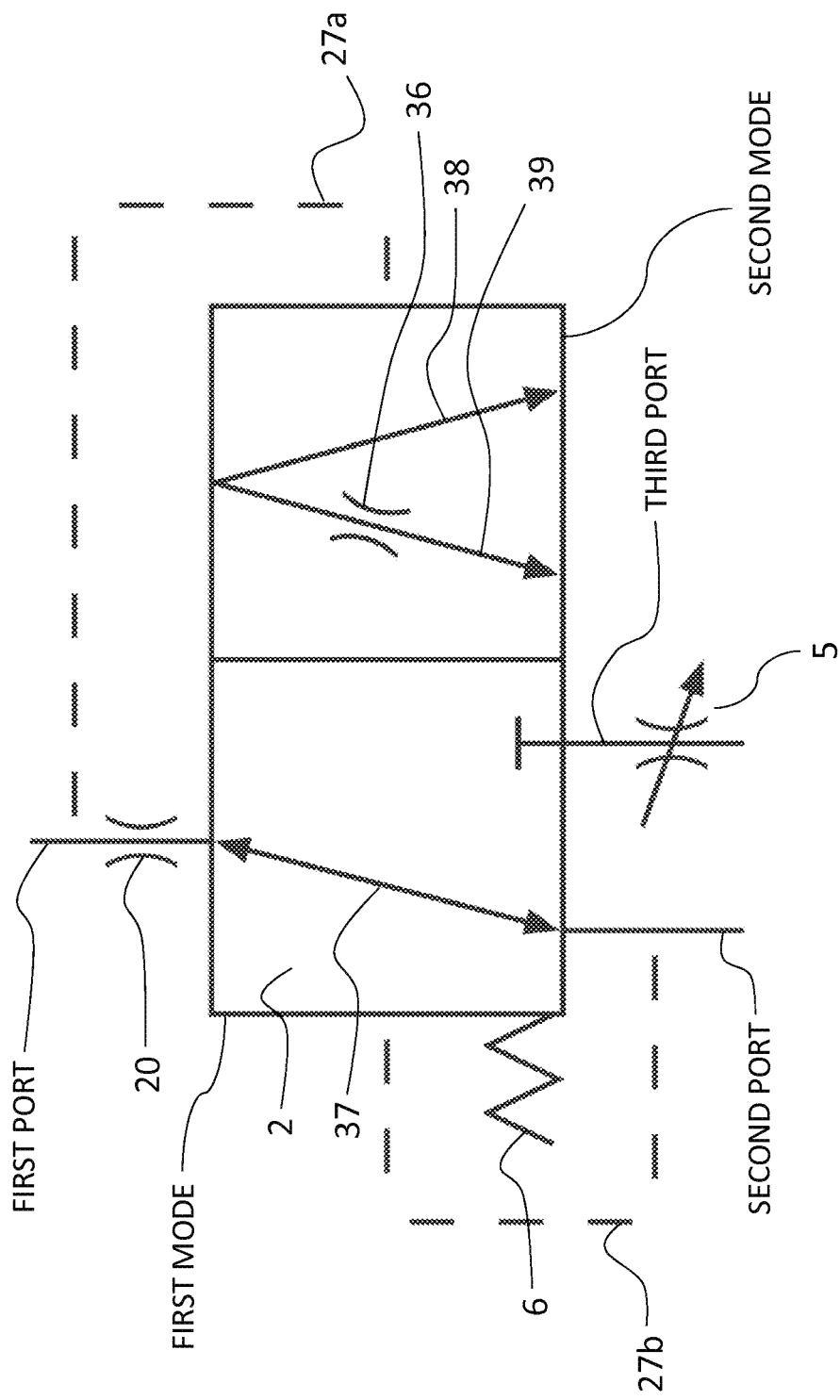
FIG. 9 is a generic schematic description of a spool type diverter valve embodiment as depicted in FIG. 1.
Figure 10:
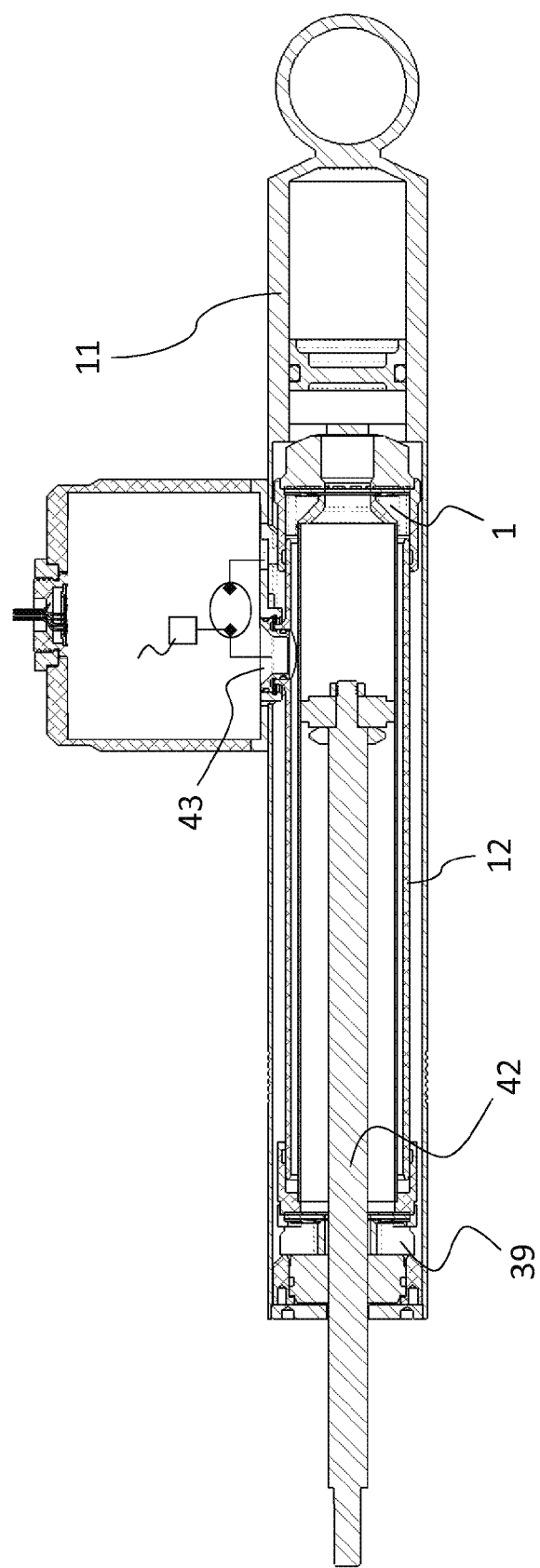
FIG. 10 is an embodiment of a regenerative active/semi active damper that comprises a hydraulic regenerative, active/semi active damper valve in a monotube damper architecture with a passive diverter valve placed in the compression and rebound chamber.
Figure 11:
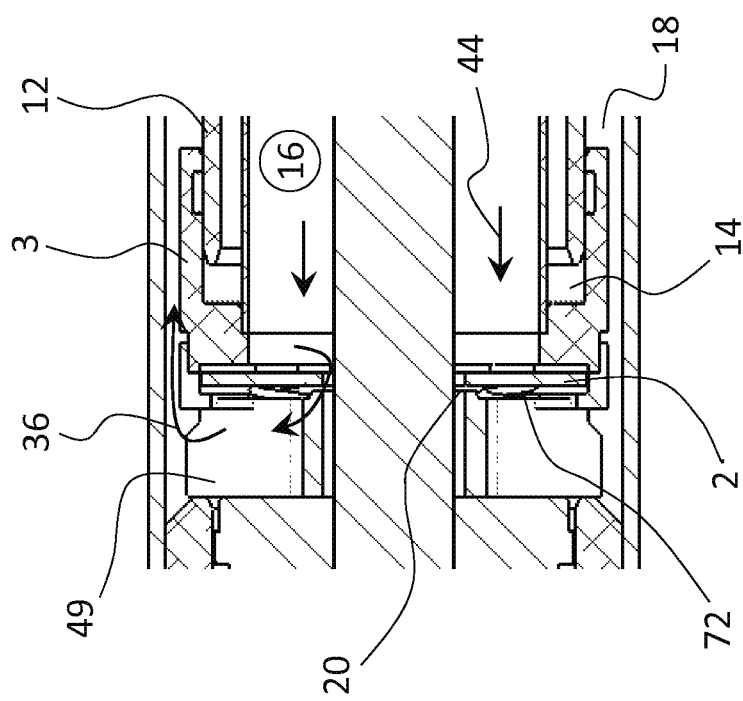
FIG. 11 is an embodiment of a diverter valve mounted in the rebound chamber of a regenerative active/semi active damper. The diverter valve is shown in cross section and in the 'un-activated' state, to show that there is free flow from the rebound chamber to the active/semi active damper valve.

Referring to FIG. 9, the embodiment of a diverter valve is shown schematically. This shows the first port (the inlet), second port (the first outlet port) and third port (the second outlet port), the moveable valve 2 (such as a spool valve), the BOV assembly 5, the pre-load spring 6, the first fluid restriction 20, the pressure acting on the annular area 27a (pressure at first port), 27b (pressure at second port), the second fluid restriction 36, and the first mode and second mode. The embodiment shows a "free flow" first mode wherein fluid flows through the first port, through the diverter 37, and into a second port (optionally coupled to a hydraulic pump/motor). This fluid path contains a first restriction 20 such that there is a pressure drop from the first port to the second port. When the pressure drop across the fluid restriction 20 creates a pressure differential between the opposing annular areas 27a and 27b to overcome the pre-load spring 6, the valve 2 switches to a diverted bypass second mode. This pressure drop is partially or wholly fluid flow velocity dependent, making the actuation point flow velocity dependent. In some embodiments the first fluid restriction 20 may be in the fluid path during the first mode only (i.e. the restriction 20 would move to the left double arrowed straight line 37). The first fluid restriction may also be variable based on parameters such as valve mode. In a second mode, fluid is able to pass from the first port to the third port via a fluid path 38. Additionally, in some embodiments fluid may pass from the first port through a second fluid restriction 36, to the second port. Optionally, a blowoff valve 5 or progressive valve stack may be operatively coupled to the output of the third port.

Referring to FIGS. 10, 11, 13, 15 & 17 the rebound diverter valve (RDV) 39 comprises a throttle body 49, a sealing disc 2 and a seal body 3. The seal body 3 is held concentric to the damper body of 11 and locates the damper pressure tube 17. The seal body 3 also locates and seals off a middle tube 12. This may provide a first annular flow passage 14, between the pressure tube and middle tube that is in fluid communication with the first port of the hydraulic pump/motor of the hydraulic valve 10, via a connector tube 43. A second annular flow passage 18, is generated between the middle tube 12 and the damper body of 11 that is in fluid connection to the second port of the hydraulic pump/motor of the hydraulic valve 10. A first port in the diverter valve is created via a bore in the center of the sealing disc 2

In a first mode, the sealing disc 2 is held against the seal body 3 by springs 6, (shown in FIG. 17), exposing a first side of the sealing disc to the pressure in the rebound chamber 16.

A first fluid restriction is generated via the relatively small circular flow passage 20 between the second side of the sealing disc 2 and throttle body 49. The seal body 3 also may contain flow orifices 75 that are in fluid communication with the first annular passage 14, and when the sealing disc 2 is held against the seal body 3 by springs 6, the sealing disc 2 blocks off the flow orifices 75, so that no flow exists between the rebound chamber 44 and the first annular passage 14.

Figure 13:
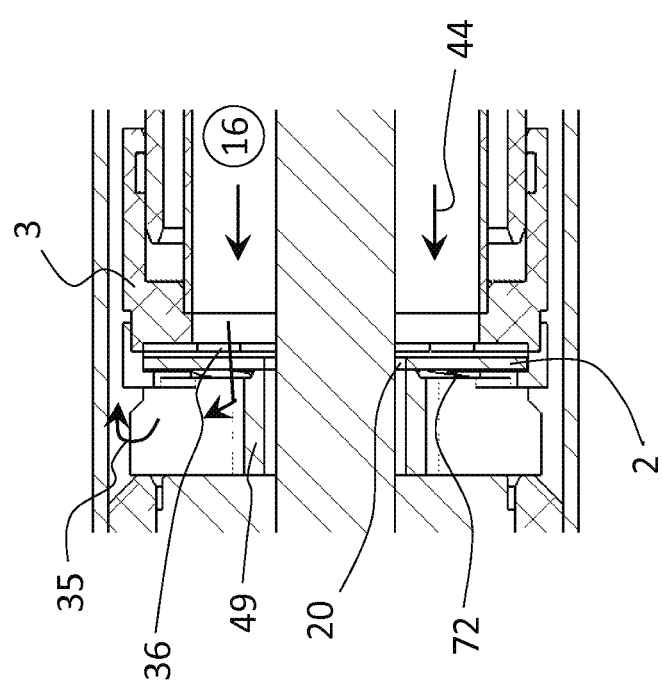
FIG. 13 is an embodiment of a diverter valve mounted in the rebound chamber of a regenerative active/semi active damper. The diverter valve is shown in cross section and in the 'activated' state, to show that there is restricted flow from the rebound chamber to the active/semi active damper valve.
Figure 14:
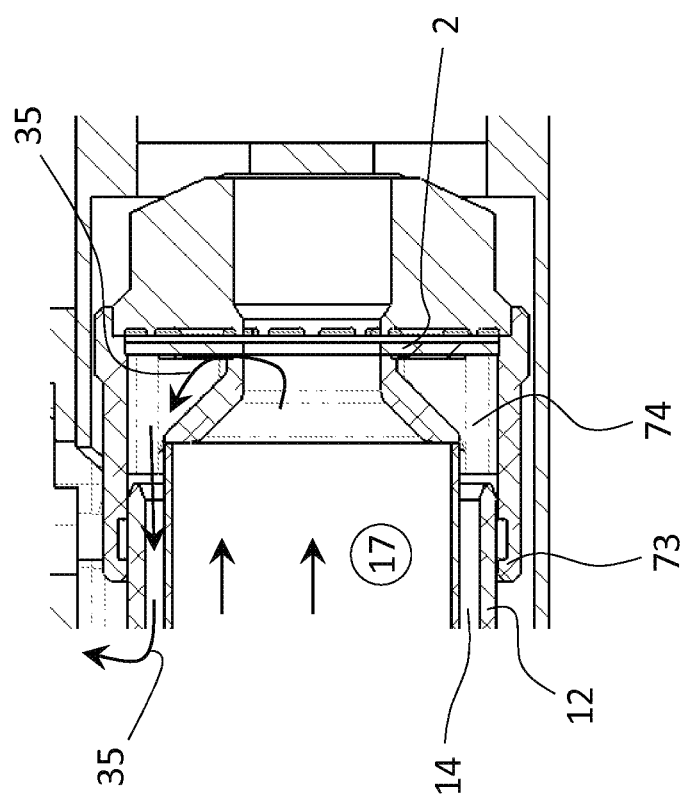
FIG. 14 is an embodiment of a diverter valve mounted in the compression chamber of a regenerative active/semi active damper. The diverter valve is shown in cross section and in the 'activated' state, to show that there is restricted flow from the compression chamber to the active/semi active damper valve.
Figure 15:
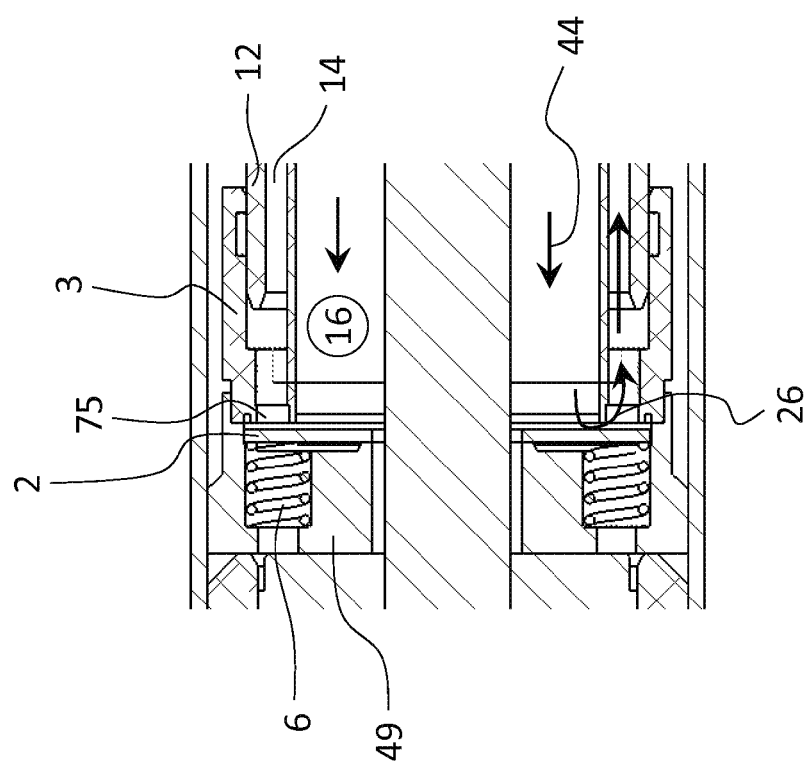
FIG. 15 is an embodiment of a diverter valve mounted in the rebound chamber of a regenerative active/semi active damper. The diverter valve is shown in cross section and in the 'activated' state, to show the by-pass flow from the rebound chamber to the compression chamber.
Figure 16:
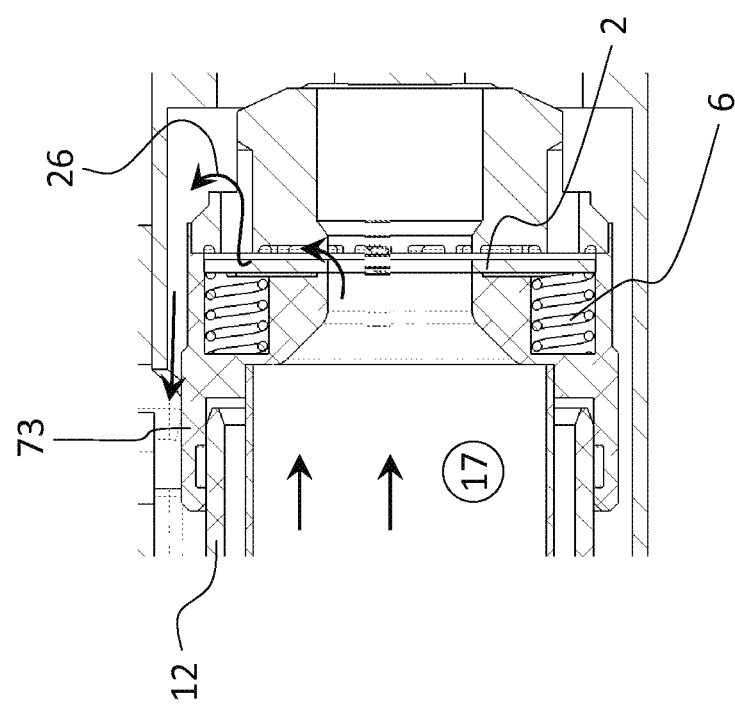
FIG. 16 is an embodiment of a diverter valve mounted in the compression chamber of a regenerative active/semi active damper. The diverter valve is shown in cross section and in the 'activated' state, to show the by-pass flow from the compression chamber to the rebound chamber.
Figure 17:
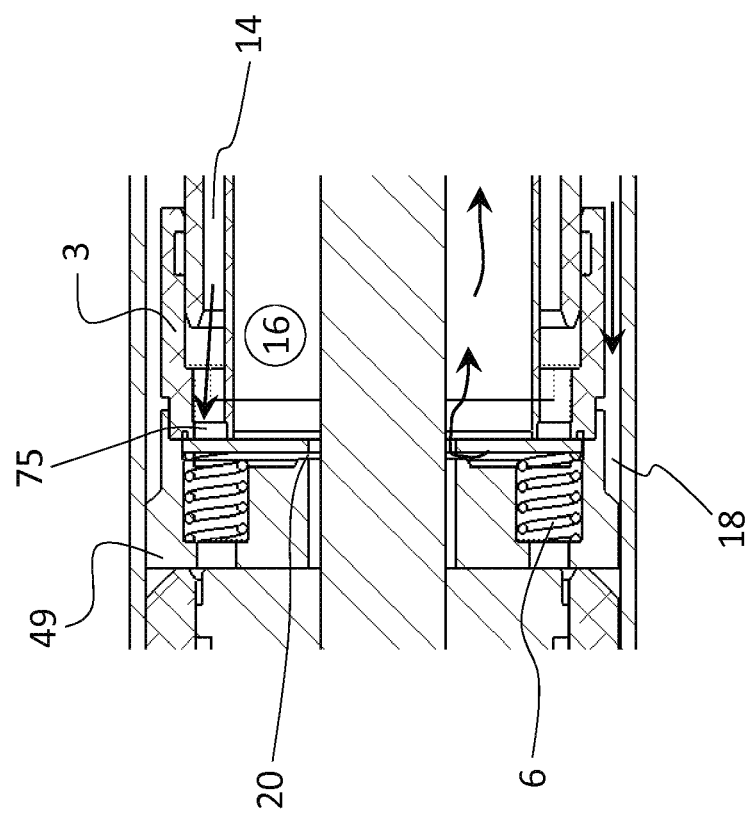
FIG. 17 is an embodiment of a diverter valve mounted in the rebound chamber of a regenerative active/semi active damper. The diverter valve is shown in cross section and in the 'un-activated' state, to show that by-pass flow from the rebound chamber to the compression chamber is blocked.
Figure 18:
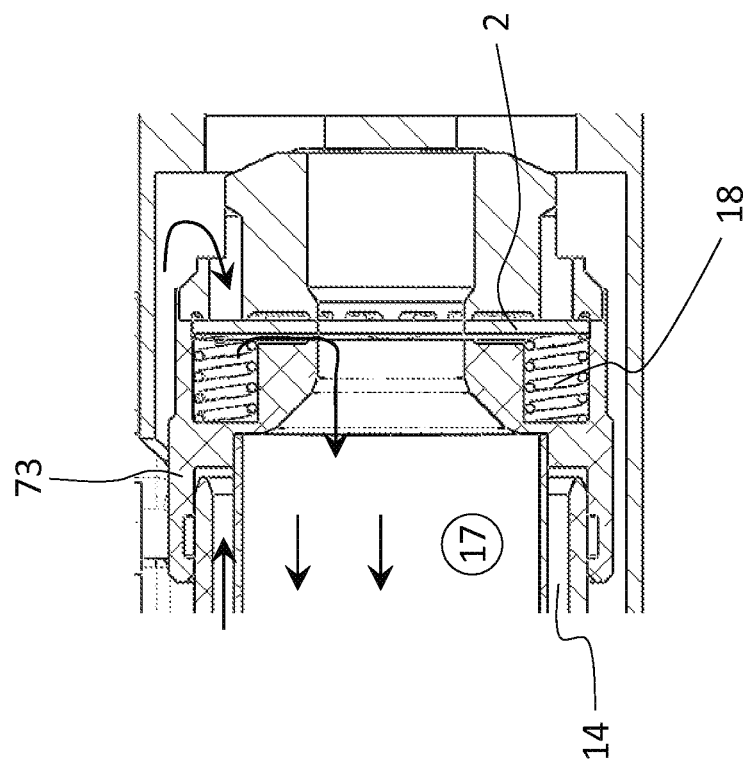
FIG. 18 is an embodiment of a diverter valve mounted in the compression chamber of a regenerative active/semi active damper. The diverter valve is shown in cross section and in the 'un-activated' state, to show that by-pass flow from the compression chamber to the rebound chamber is blocked.

A second port is created by flow passages 72 in the throttle body 49 that is in fluid communication with the second annular flow passage 18, and hence the second port of the hydraulic pump/motor of the hydraulic valve 10. Via the first port, the rebound chamber 16 is in fluid communication with the circular flow passage 20, and the flow passages 72 in the throttle body 49, as shown by the flow arrows, 35. Therefore, when the damper is in rebound, fluid flows from the rebound chamber 16, through the first port, through the circular flow passage 20, through the second port of flow passages 72 in the throttle body 49, and to the second port of the hydraulic pump/motor of the hydraulic valve 10, via the second annular flow passage 18, as shown by flow arrows 44 and 26. The relatively small circular flow passage 20 offers a first fluid restriction to this flow, and may cause a pressure drop on the second side of the sealing disc 2 that is proportional to the flow, this may generate a force imbalance across the sealing disc 2, counteracting the preload on the sealing disc from the springs 6. As the rebound flow increases, the pressure drop and hence the force imbalance across sealing disc 2 also increases, until the force imbalance becomes greater than the spring preload, whereby, the sealing disc 2 may start to close toward the throttle body 49. As the sealing disc 2 closes toward the throttle body 49, the circular flow passage 20 decreases in size and hence increases the pressure drop and the force imbalance thereby, causing the sealing disc 2 to close even further, until it becomes fully closed against the throttle body 49, whereby the RDV is in a second mode. The circular flow passage 20 may now be completely closed, as shown in FIG. 13. The RDV is therefore flow activated, and since rebound flow is proportional to rebound damper velocity, the RDV is activated at by rebound damper velocity. By adjusting the preload on the springs 6 and/or the size of the circular flow passage 20, the velocity at which the valve activates can be readily tuned.

When the RDV 39 is in second mode, (as shown in FIG. 13), flow to the second port of the hydraulic pump/motor of the valve assembly 10 is severely restricted, forcing fluid through a second fluid restriction via small orifices 36 in the sealing disc 2, as shown by flow arrows 35. This may limit the speed at which the pump/motor of the assembly 10 rotates when the RDV is activated.

Figure 12:
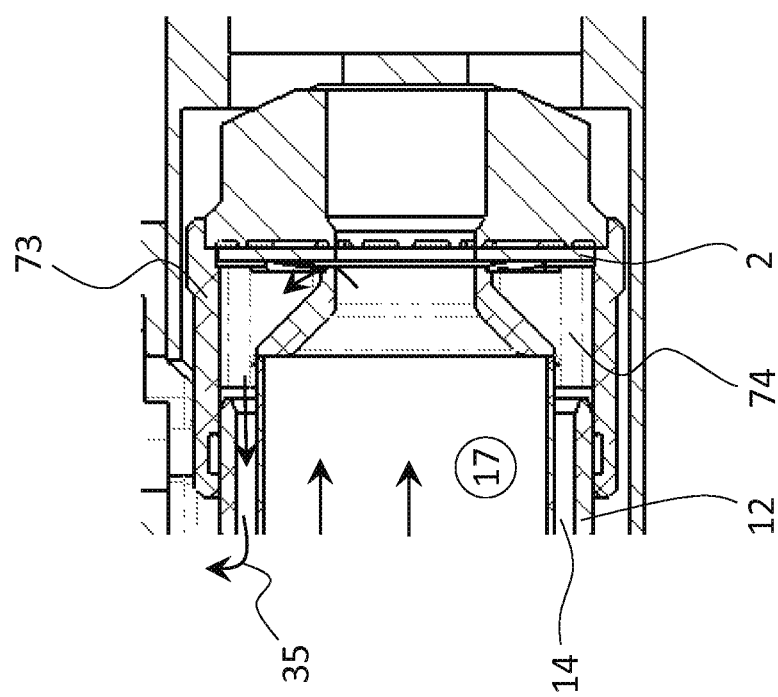
FIG. 12 is an embodiment of a diverter valve mounted in the compression chamber of a regenerative active/semi active damper. The diverter valve is shown in cross section and in the 'un-activated' state, to show that there is free flow from the compression chamber to the active/semi active damper valve.

As the sealing disc 20 closes toward the throttle body 49, it moves away from the seal body 3, opening a third port via the small flow orifices 75 that are in fluid communication with the first annular passage 14. This may now allow fluid flow from the rebound chamber 44 to the first annular passage 14, via the small flow orifices 75. As well as being in fluid communication the second port of the pump/motor of the hydraulic valve 10, the first annular passage 14 is also in fluid communication with the compression chamber 17, via flow passages 74 in the CDV throttle body 73, as shown in FIG. 12.

Therefore, when the RDV 39 is in the second mode, it may allow flow from the rebound chamber 44 to two distinct flow paths; the first flow path is to the second port of the pump/motor of the hydraulic valve 10, via the second fluid restriction of orifices 36 in the sealing disc 2, and the second flow path is to compression chamber, via the first annular passage 14, and flow passages 74 in the CDV throttle body 73. Therefore, when in the second mode, the RDV 39 bypasses some flow from the primary flow path—the second port of the pump/motor of the hydraulic valve 10, to a secondary flow path—the compression chamber 17. This has the effect of limiting flow to the pump/motor of the hydraulic valve 10, whilst bypassing flow from the rebound chamber 16 to the compression chamber 17 simultaneously controlling the pressure drop that is generated.

Since the flow to the compression chamber 17 is via the small flow orifices 75 in the seal body 3, the pressure/flow characteristic of this flow path can be readily controlled to provide the desired passive damping coefficient when the damper velocity is at a high enough speed to activate the diverter valve. As well as varying the orifice flow coefficient, the distance that the sealing disc 2 moves away from the seal body 3 can be varied to vary the flow coefficient. Also, the sealing disc 2 may constructed of a stack of flex washers (as opposed to one, stiffer, washer) that can vary the opening to the small flow orifices 75, due to flexure of the flex washer stack under increasing pressure in the rebound chamber. These types of valves are well known in the art and the multi-path fluid diverter valve methods and systems described herein are not limited in this regard. Due to the flexibility of how the passive damper coefficient can be tuned, the passive damper coefficient can be higher than the maximum damper force generated by the hydraulic regenerative, active/semi active damper valve 10, or lower than the minimum damper force generated by the hydraulic regenerative, active/semi-active damper valve 10, or anywhere in between, as shown in FIG. 19.

When the sealing disc 2 is held against the seal body 3 by springs 6, the small flow orifices 75 in the seal body 3 present an area on the second side of the sealing disc 2, and any pressure differential that exists between the first annular passage 14 and the second annular passage 18 (due to the pressure differential between the rebound and compression chambers due to the damper force), may generate a force on the sealing disc due to the area presented on the second side of the sealing disc. This force may act in parallel to the force imbalance on the sealing disc 2 from the flow through the first fluid restriction, and by controlling the pressure differential between the first annular passage 14 and the second annular passage 18, the force imbalance, and hence the activation point, on the RDV can be controlled. Since the differential between the first annular passage 14 and the second annular passage 18 is controlled by the hydraulic regenerative, active/semi-active damper valve 10, the damper velocity at which the RDV activates from the first mode to the second mode can now be controlled by varying the damper force via the hydraulic regenerative, active/semi-active damper valve 10. The loading on the hydraulic regenerative, active/semi active damper valve, 10 can be accurately controlled so as to smooth out the transition to passive damping when the RDV activates, thereby improving the ride quality of the damper.

Figure 19:
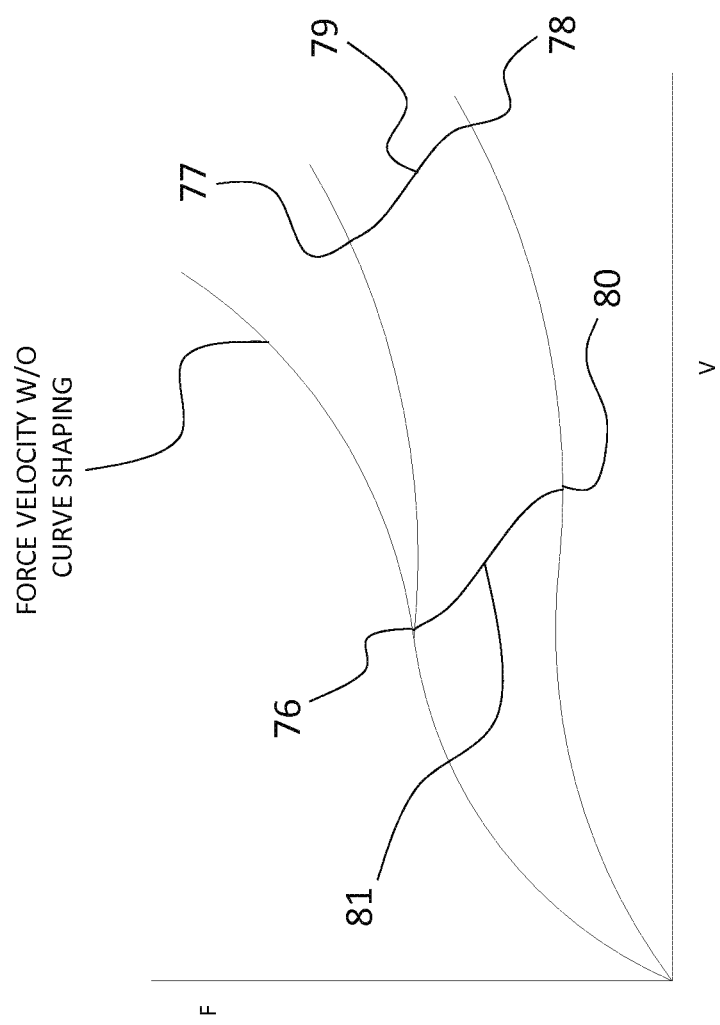
FIG. 19 is a curve of force/velocity of a regenerative active/semi active damper with passive diverter valve curve shaping.

Since the passive damper coefficient after the RDV has been activated can be readily tuned to be either greater or lower than the maximum damper force, and the damper velocity at which the RDV activates can be controlled by the hydraulic regenerative, active/semi active damper valve, a broad damper force curve, similar to that shown in FIG. 19 can be achieved, whereby; the activation velocity at max damper force is shown by point 76, the activation velocity at min damper force is shown by point 79, and the curve 77 represents the maximum tuned passive damping coefficient after the RDV has activated, and the curve 78 represents the minimum tuned passive damping coefficient after the RDV has activated. The area 79 between the maximum and minimum tuned passive damping coefficient curves 77 and 78 respectively, is the broad range to which the passive damping coefficient can be tuned, to suit any particular application. One method for tuning this damper force-velocity characteristic at damper velocities larger than the activation velocity 80, within the tuning range of maximum and minimum passive damping coefficient curves 77 and 78, is by tuning the pressure-flow characteristic of the diverter valve BOV 5, in this case of the RDV.

When the damper is in compression, fluid may flow from the second port of the hydraulic pump/motor of the hydraulic valve 10, through the second annular flow passage 18 into the rebound chamber 44. Fluid may be in communication from the compression chamber 17 to the first annular passage 14, via the CDV 1. The pressure in the compression chamber 17 may be proportional to the compression damping force, and this pressure may be present at the small flow orifices 75. Due to the area exposed on the sealing disc 2 from the small flow orifices 75, the compression chamber pressure may generate a separating force on the sealing disc, counter-acting the preload placed on the sealing disc 2 from the springs 6. Once the separating force becomes greater than the preload force, the sealing disc 2 may start to move away from the seal body 3, allowing fluid to flow from the first annular passage 14 (and hence the compression chamber 17) to the rebound chamber 16. This may limit the pressure that can be achieved in the compression chamber, and thereby the RDV may now act as a compression BOV, when the damper is in compression. Although the diverter valve offers blow-off functionality, it might be desirable to use another BOV acting with, or instead of, the diverter valve BOV. This other BOV could be in several forms, and the patent is not limited in this regard.

Referring to FIGS. 12, 14, 16 & 18; the compression diverter valve (CDV) 1 operates in a similar manner to that of the RDV 39, and operates to limit the pump/motor speed of the hydraulic valve 10 when the damper is at high compression damper velocities, and to provide a broad passive compression damper coefficient after the CDV has been activated, as well as to act as a rebound BOV limiting the maximum rebound pressure when the damper is in rebound.

Although the damper architecture shown in the above figures is that of a monotube arrangement, the valving described above can be used in a hydraulic regenerative, active/semi-active damper valve that is incorporated in a twin tube or triple tube damper architecture, and the multi-path fluid diverter valve methods and systems described herein are not limited in this regard.

For purposes of clarity, the following is a list of figure elements and their respective references in this disclosure and the figures, specifically pertaining to but not limited to FIGS. 20 through 30:

2—designates the movable sealing element.
6—designates a force element that biases the movable sealing element into the first mode position, such as a spring.
20—designates a surface section(s) on the movable sealing element, at least partially forming the first fluid flow restriction in the fluid path between the first and second ports.
26—designates fluid flow arrow(s) along the main fluid flow path between the first and second ports.
27a—designates the projected effective fluid pressure area of the movable sealing element onto a plane perpendicular to the direction of travel of the movable sealing element during the transition between the first and second modes, of any surface sections that stand in primary fluid pressure communication with the flow path between the first and second ports, facing towards the first port.
27b—designates the projected effective fluid pressure area of the movable sealing element onto a plane perpendicular to the direction of travel of the movable sealing element during the transition between the first and second modes, of any surface sections that stand in primary fluid pressure communication with the flow path between the first and second ports, facing towards the second port.
27c—designates the projected pressure area onto a plane normal the direction of travel of the movable sealing element of an area on the movable sealing element that stands in primary fluid pressure communication with flow path between the first and second ports.
27d—designates the projected pressure area onto a plane normal to the direction of travel of the movable sealing element that does not stand in primary fluid pressure communication with the flow path between the first and second ports.
33—designates a fluid cavity comprised of at least one surface section of the movable sealing element.
36—designates the second fluid restriction(s) in the fluid path between the first and second ports that is generally substantially negligible during the first mode. During the transition between modes, in some embodiments, this second flow restriction may consist of two distinct flow restrictions:
36a—a first flow restriction that becomes more restrictive during the transition between the first and second modes and less restrictive in the reverse transition as a function of axial stroke position of the movable sealing element
and:
36b—designates a second flow restriction that behaves in reverse manner to the first flow restriction 36a by becoming less restrictive during the transition between the first and second modes and more restrictive in the reverse transition as a function of axial stroke position of the movable sealing element.
36a—designates the second fluid restriction(s) in the fluid path between the first and second ports that is generally substantially negligible during the first mode.
45—designates a pressure level near the first port of the diverter valve assembly.
46—designates a pressure level near the second port of the diverter valve assembly.
47—designates a pressure level near the third port of the diverter valve assembly.
48—designates a pressure level primarily in communication with pressure levels somewhere along the flow path between the first and second ports.
50—designates a primary fluid pressure communication passage between a fluid cavity and a fluid flow path.
51—designates label(s) for an effective fluid pressure area acting on the movable sealing element projected onto plane that is perpendicular to the direction of travel of the movable sealing element during the transition between first and second modes.
52—designates the axis of rotational symmetry of the movable sealing element and, in many embodiments, the sealing manifold assembly.

53—designates the sealing manifold assembly that houses the movable sealing element, the first, second, and third ports, any fluid flow paths, fluid flow restrictions and/or fluid flow valves between the first and second ports or between the first and third ports.

54—designates motion arrow(s) indicating direction of travel of the movable sealing element when transitioning between the first and second modes.

55—designates secondary sealing interface(s) between the movable sealing element and the manifold assembly on which it seals, at least partially restricting pressure and flow communication between the first and second ports during the second mode.

56—designates sealing interface(s) between the movable sealing element and the manifold assembly on which it seals, substantially restricting pressure and flow communication between the first and third ports in the first mode.

57a—designates a system pressure level in a first fluid chamber of the diverter valve assembly.

57b—designates a system pressure level in a second fluid chamber of the diverter valve assembly.

57c—designates a system pressure level in a fluid cavity.

58—designates a shaped insert that is a part of the sealing manifold assembly 53 of the diverter valve, at least partially responsible for forming the second flow restriction 36 along the flow path between the first and second ports.

59—designates fluid flow arrow(s) indicating a primary fluid flow path passing through a primary fluid pressure communication path between a fluid cavity and a fluid flow path.

60—designates label(s) for a primary fluid pressure communication passage between a fluid cavity and a fluid flow path.

61—designates an effective fluid flow area of a flow passage between two fluid chambers of the diverter valve assembly.

61a—designates the effective fluid flow area of the second flow restriction 36 along the flow path between the first and second ports.

61b—designates the effective fluid flow area of the primary pressure communication feature between the spring cavity and another fluid volume within the diverter valve assembly.

62a—designates an element of the diverter valve assembly that is either part of the movable sealing element or part of its sealing manifold assembly.

62b—designates an element of the diverter valve assembly, separate from element 62a, that is either part of the movable sealing element or part of its sealing manifold assembly. If element 62a is a representation of its first embodiment, 62b is a representation of its second embodiment, and vice versa.

63—designates a reference measurement scale indicating travel position of movable sealing element, fixed with respect to element 62b.

64—designates a sealing flow—gap between the movable sealing element and the manifold assembly on which it seals.

65—designates surface section(s) on an element of the diverter valve assembly, at least partially forming a variable fluid flow restriction between two separate elements of the diverter valve assembly that varies as a function of the relative position of these two elements with respect to another.

66—designates a qualitative characteristic curve showing the effective primary fluid flow area between two fluid chambers as a function of travel position of the movable sealing element with respect to the manifold assembly on which it seals.

67—designates a coordinate axis with units of displacement showing the relative travel position of the movable sealing element with respect to the manifold assembly on which it seals.

68—designates a coordinate axis with units of area showing the effective primary fluid flow area between two fluid chambers.

69—designates fluid flow arrow(s) indicating a primary fluid flow path through a primary fluid pressure communication passage between two fluid chambers.

70—designates fluid flow arrow(s) indicating leakage fluid flow path through a sealing gap between two mating fluid sealing surfaces.

71a—designates pressure force arrow(s) representing the component of the net fluid pressure force acting on a surface, that is directed along the direction of travel the movable sealing element, towards the first port of the diverter valve assembly.

71b—designates pressure force arrow(s) representing the component of the net fluid pressure force acting on a surface, that is directed along the direction of travel the movable sealing element, towards the second port of the diverter valve assembly.

Referring to FIG. 20A, a schematic of a spool type diverter valve is shown in or near the first mode position of the spool type movable sealing element 2. The direction of travel of the spool during the transition between the first and second modes is indicated by motion arrow 54. The spool 2 is rotationally symmetric about its axis of symmetry 52. The internal bore of the spool 20 forms the first flow restriction in the flow path between the first and second ports, indicated by fluid flow arrows 26. In the first mode position, the spool valve seals radially 56 on its outer diameter with the sealing manifold assembly 53 allowing negligible flow and pressure communication between the first and third ports. In the second mode the spool valve seals at least partially with the sealing manifold assembly on secondary sealing surface 55 which is perpendicular to the axis of symmetry of the spool, at least partially sealing the flow path between the first and second ports. In this embodiment, any fluid communication between the first and second ports when the spool 2 is in the second mode position, passes through the secondary flow restriction along the flow path between the first and second ports 36. In this embodiment, the pressure level near the inlet of the spool 45 is close to the pressure at the first port. The pressure level after the secondary flow restriction along the flow path between the first and second ports 46 is close to the pressure level at the second port. The pressure level just after the primary sealing interface 56 between the spool 2 and the sealing manifold 53 along the flow path between the first and third ports 47 is either similar to the pressure level at the third port, or similar to the pressure level in the BOV cavity. For these conditions to be met during all modes, any other changes in pressure along sections of flow paths within the diverter valve assembly due to elements not explicitly detailed in this schematic (other than a BOV) are assumed to be substantially negligible. Therefore, it is sufficient to interchangeably refer to pressure 45 the pressure at or near the first port, pressure 46 the pressure at or near the second port, and pressure 47 the pressure at or near the third port. The force element that biases the movable sealing element into the first mode position 6 sits in a fluid cavity 33 which stands in primary fluid pressure communication with a pressure level 48 at a point along the flow path between the first and second ports, through a pressure communication element 50. The respective projected pressure areas 27*c* of a particular set of surface sections of the spool 2 onto a plane perpendicular the axial direction of the spool 2 are labeled 51. A unique capital letter A through E is assigned to each surface, as well as a sign (+ or −) depending on whether the respective projected pressure area faces towards the first port (−) or towards the second port (+).

Referring to FIG. 20B, shown is a stack of all projected pressure areas 27*c* A through E with the corresponding relative magnitudes preserved.

Figure 20:
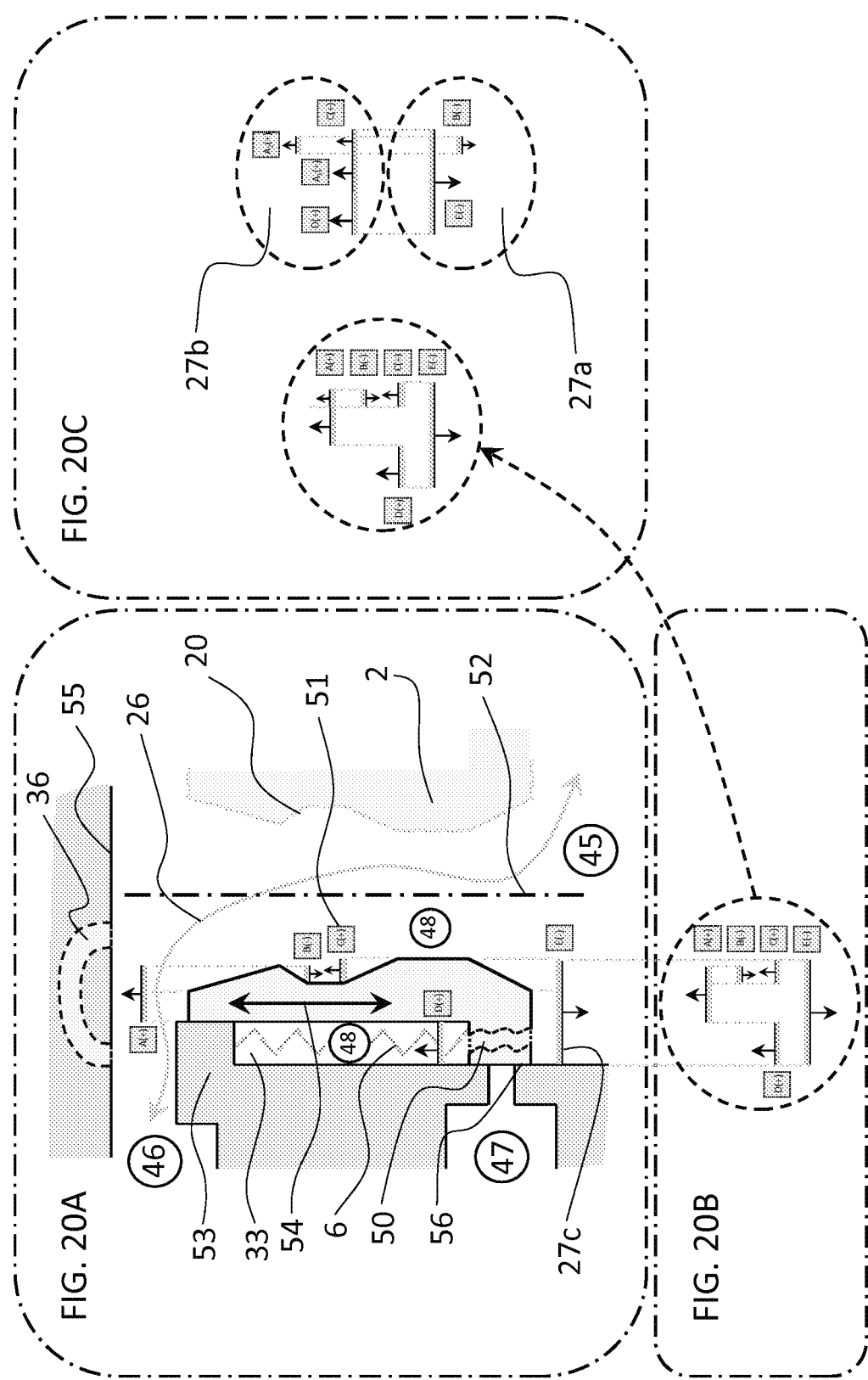
FIG. 20A is a schematic of a spool type diverter valve (DV) that depicts the projected fluid pressure areas of the movable sealing element onto a plane perpendicular to the direction of travel.
FIG. 20B is a schematic of the stack-up of effective pressure areas of a spool type diverter valve (DV).
FIG. 20C is a schematic of the stack-up of effective pressure areas of a spool type diverter valve (DV) that shows the projected pressure area of the first side of the moveable sealing element to be substantially equal in area to the second side of the moveable sealing element.

Referring to FIG. 20C, shown is the stack of all projected pressure areas 27*c* A through E, as shown in FIG. 20B, grouped by corresponding directional vectors (+) and (−), to form the pair of effective pressure areas 27*a* and 27*b* for the set of all fluid immersed effective pressure areas on the movable sealing element 2 that stand in primary pressure communication with the flow path between the first and second ports. For the embodiment of the diverter valve shown in FIG. 20, these two resulting opposing effective pressure areas 27*a* and 27*b* are substantially equal in magnitude.

FIGS. 20A through 20C present a method to determine one of the possible unique pairs of effective projected pressure areas, for one of the unique sets of all surface sections that stand in pressure communication with the same unique flow path or pressure level, for any arbitrary spool type embodiment of the movable sealing element 2. This same or any analogous methods can be used to determine all unique effective projected pressure area pairs for any other embodiment of the movable sealing element 2, as well as for fluid cavities 33.

A unique feature of the spool type embodiment of the diverter valve as shown in the schematic of FIG. 20A, is that any complete sets of all possible fluid-submerged projected pressure areas of all surface sections of this embodiment of movable sealing element, that are not negligible, 27*c* A through E, are entirely only exposed to the pressure levels along a single unique flow path: pressure levels along the flow path between the first and second ports 48. For other embodiments of the diverter valve, the movable sealing element may have any number of unique sets of projected pressure areas that each stand in pressure communication with different unique flow paths or pressure levels. For these different types of movable sealing elements, the pairs of effective projected pressure areas for any of these unique flow paths or pressure levels, need to be evaluated separately.

For a unique set of embodiments of the diverter valve where all possible sets of projected pressure areas from only one pair of effective projected pressure areas, as is the case with the embodiment shown in FIG. 20, the following are preferably true:

The primary sealing interface 56 between the movable sealing element 2 and its sealing manifold assembly 53 should establish a radial seal (perpendicular to the direction of travel of the movable sealing element)

any fluid cavities 33 that each share at least a small surface section with the movable sealing element 2, each either stand in primary fluid pressure communication with the flow path between the first and second ports, or each is directed only in the radial direction with respect to the movable sealing element 2, perpendicular to the direction of projection.

For any embodiments of the diverter valve that meet these requirements, the net fluid pressure force acting on the respective movable sealing element 2, depends only on the fluid flow rate passing between the first and second ports and is not substantially impacted by pressure levels that exists elsewhere in the hydraulic system of the diverter valve.

Figure 21:
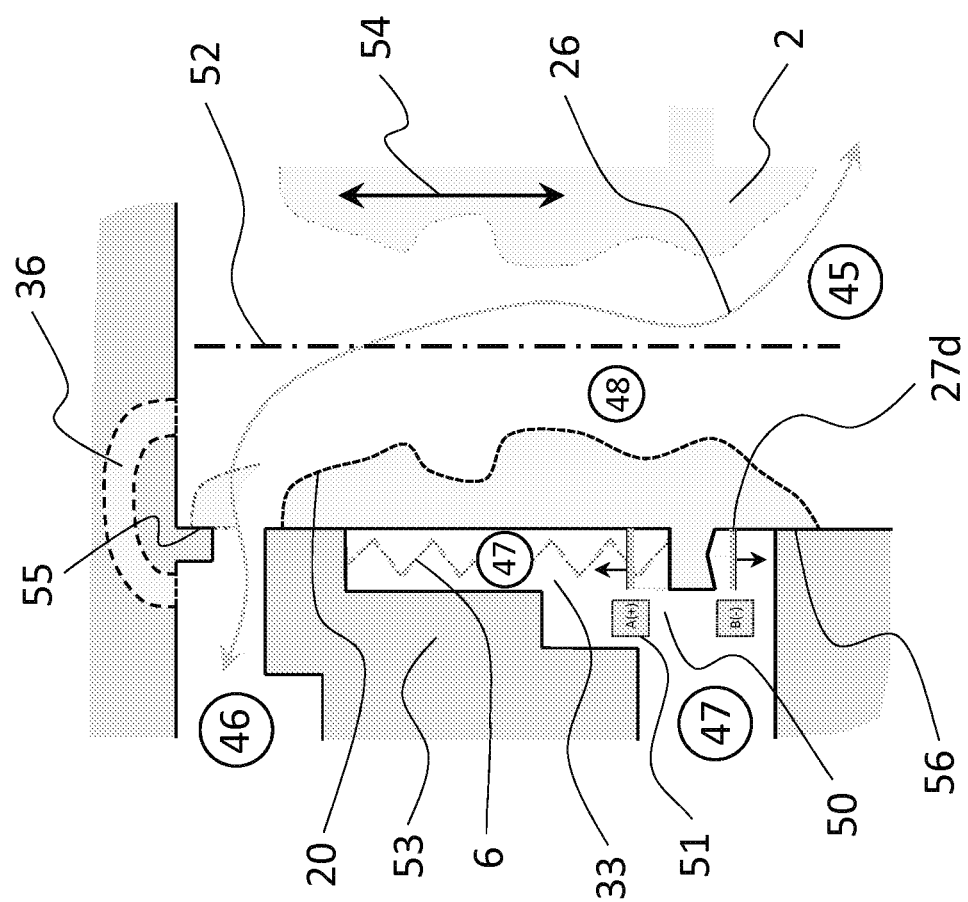
FIG. 21 is a schematic of a spool type diverter valve (DV) that depicts the projected fluid pressure areas of the movable sealing element that are not in primary fluid pressure communication with the flow path between the first and second ports, onto a plane perpendicular to the direction of travel.

Referring to FIG. 21; shown is a schematic of a spool type embodiment of a diverter valve. The figure elements and descriptions detailed in this schematic are similar to those shown in the schematic of FIG. 20A with some key differences. The fluid cavity 33 which houses the spring element 6 that biases the movable sealing element 2 into the first mode position is not in primary fluid pressure communication with the flow path between the first and second ports, but rather is in primary fluid pressure communication with the flow path between the first and third ports. Due to the radial primary sealing interface 56 between the movable sealing element 2 and its sealing manifold assembly 53, there is substantially negligible flow and pressure communication between the first and third ports during the first mode. The pressure level 47 inside the fluid cavity 33 is substantially equal to the pressure level near the third port 47 or near the effective pressure level inside a BOV cavity. This is because any number of elements, acting as an effective blowoff valve (BOV) along the flow path between the first and third ports during the second mode, may be placed between the primary sealing interface 56 and the flow features that constitute the third port, establishing a substantially different pressure level inside the BOV cavity than may exist at or near the features that constitute the third port of the diverter valve.

In this embodiment of the diverter valve, the two effective projected pressure areas that constitute the pair of effective projected pressure areas that is in pressure communication with the flow path between the first and second ports, are substantially equal in size. Unlike in the schematic of FIG. 20A, these two effective pressure areas 27*a* & 27*b* are not explicitly shown. Instead, all pairs of effective projected pressure areas 27*d* of surface sections that do not stand in primary fluid pressure communication with the flow path between the first and second ports are shown. Each of the individual effective projected pressure areas that constitute these pairs of effective projected pressure areas is labeled 51 with a unique capital letter A & B and a sign indicating the direction each is facing: effective projected pressure area A is facing towards the second port (+), and effective projected pressure area B is facing towards the first port (−), forming a unique pair of effective projected pressure areas that stands in primary pressure communication with a pressure level 47, and is not in primary pressure communication with the flow path between the first and second ports.

If the two areas that constitute a unique pair of effective projected pressure areas are substantially equal in size, the fluid pressure force acting on the part due to those areas in the direction normal to the projection plane is only dependent on effective pressure variations along the section of the fluid path or fluid volume that stands in primary pressure communication with any of the projected pressure areas that substantially contribute the this pair of effective projected pressure areas. If all of these effective pressure variations along this section of a flow path or volume are substantially a function of the volumetric fluid flow passing along this section of a flow path or fluid volume, substantially all effective pressure force acting on the part due to this unique pair of effective pressure areas is substantially only a function of this volumetric fluid flow.

The following is a general set of rules relating a unique effective fluid pressure force acting on a fluid submerged part or assembly due to system pressures acting on any one of the unique pairs of effective projected pressure areas, to the relative sizes of the two effective pressure areas constituting this unique pair of effective projected pressure areas and the respective effective pressures acting over these two effective projected pressure areas: Any substantially equal pair of effective pressure areas that are fully in primary fluid pressure communication with a unique flow path on a fully fluid immersed part, will only generate a pressure force on the part in the direction normal to the projection plane. The pressure force is entirely dependent on the fluid flow rate along the corresponding flow path.

Any pair of effective pressure areas that are fully in primary fluid pressure communication with a unique flow path on a fully fluid immersed part that are not substantially equal will generate a pressure force on the part in the direction normal to the projection plane. The pressure force is partially dependent on the fluid flow rate along that flow path, and partially dependent on the absolute system pressure at some point along that flow path.

Any pair of effective pressure areas on a fully fluid immersed part that are fully in primary fluid pressure communication, are substantially equal, and are at substantially the same pressure level, will generate a pressure force on that part that is substantially negligible.

Any pair of effective pressure areas on a fully fluid immersed part that are fully in primary fluid pressure communication, are not substantially equal, and are at substantially the same pressure level, will generate a pressure force on the part. The pressure force is fully dependent on the pressure level that the effective pressure areas stand in communication with.

For any fully fluid-immersed part or assembly whose surface sections stand in primary fluid pressure communication with any unique flow path and pressure level, any combination of these effects can combine to effectively impart any combination of possible flow and pressure dependencies on the net fluid pressure force acting on the part or assembly.

In most embodiments of the diverter valve, it is desirable to achieve a net fluid pressure force acting on the movable sealing element 2 along its direction of travel during the transition between the first and second modes that substantially depends solely on the fluid flow rate along the flow path between the first and second ports. It is also desirable for the net fluid force acting on the movable sealing element 2 to be independent of other pressure forces within the hydraulic system.

In order for the net fluid pressure force on the movable sealing element, in its axial direction, to be solely dependent on the fluid flow rate between the first and second ports, the pair of effective pressure areas of the movable sealing element that are in primary fluid pressure communication with the flow path between the first and second ports that are projected onto a plane perpendicular to the axial direction of the movable sealing element, should be substantially equal in size. Furthermore, any pairs of effective projected pressure areas of the movable sealing element that are in primary fluid pressure communication with other unique flow paths that each are not sections of the flow path between the first and second ports, such as pressure levels along the flow path between the first and third ports, should be substantially negligible in size. The pressure forces generated by the fluid acting on these areas does not contribute to the net pressure force balance on the movable sealing element in its axial direction. Any remaining pairs of effective projected pressure areas on the movable sealing element that are in primary fluid pressure communication with other unique pressure level that each are not sections of any of the flow paths that have already been accounted for, such as a unique pressure level along the flow path between the first and third ports, should be substantially equal in size, such that they do not contribute to the net pressure force balance on the movable sealing element in its axial direction.

The first embodiment of a spool type diverter valve detailed in the schematic FIG. 20A has a single pair of effective projected pressure areas that are fully in primary fluid pressure communication with the flow path between the first and second ports. The second embodiment of a spool type diverter valve detailed in schematic FIG. 21 has two unique pairs of effective projected pressure areas, one of which is fully in primary fluid pressure communication with the flow path between the first and second ports, the other of which is in primary pressure communication with a unique pressure level along the flow path between the first and third ports and is therefore not in primary fluid pressure communication with the flow path between the first and second ports. The first pair is exposed to an effective range of pressure levels 47 along the flow path between the first and second ports, the second pair is exposed to a unique pressure level 48. The second pair of effective projected pressure areas is represented as B(−) and A(+). The effective pressure force acting on the movable sealing element due to this second pair is substantially negligible.

In order to achieve a flow dependent activation of the diverter valve wherein the transition from the first to the second mode is due solely to the effect of the fluid flow along the flow path between the first and second ports, the net external forces acting on the movable sealing element 2, other than the net pressure force and the opposing force from the effective force element, are preferably kept to substantially negligible levels. These net external forces include but are not limited to inertial forces due to acceleration. Movable sealing element optimized for low effective density and size are preferable for use in environments exposed to substantial acceleration levels, such as certain types of suspension systems.

Referring to FIGS. 20A & 21; in the first mode position of both embodiments of a spool type diverter valve as detailed in the two schematics, the normal vectors of all effective sealing interfaces 56 between the movable sealing element and its sealing manifold assembly are substantially perpendicular to the direction of travel of the movable sealing element 54 in the axial direction.

Referring to FIG. 21; a unique aspect of the specific embodiment of the spool type diverter valve as shown in the schematic is that when the movable sealing element 2 is in the second mode position, the normal vectors of all effective sealing interfaces 55 between the movable sealing element 2 and the manifold assembly on which it seals 53 are substantially perpendicular to the direction of travel of the movable sealing element 54 in the axial direction. Radially sealing interfaces in the second mode position are also possible to achieve with some embodiments of the disc type diverter valve.

Another unique aspect of the specific embodiment of the spool type diverter valve as shown in FIG. 21 is that only the first flow restriction along the path between the first and second ports contributes substantially to the net pressure force balance on the spool during the second mode. This is due to the fact that during the second mode, the normal vectors of the effective sealing interfaces 55 between the movable sealing element 2 and the manifold assembly on which it seals 53 are substantially perpendicular to the direction of travel of the movable sealing element 54. In addition, the secondary flow restriction 36 along the path between the first and second ports becomes active during the second mode. The secondary flow restriction 36 does not contribute to the net pressure force balance on the movable sealing element 2 because the effective change in pressure that is created by the fluid passing through this substantial flow restriction does not act on any effective pressure areas of the spool.

The embodiment of a spool type diverter valve detailed in FIGS. 1A through 4 is substantially similar to the embodiment of a spool type diverter valve as detailed in the schematic of FIG. 21.

Figure 22:
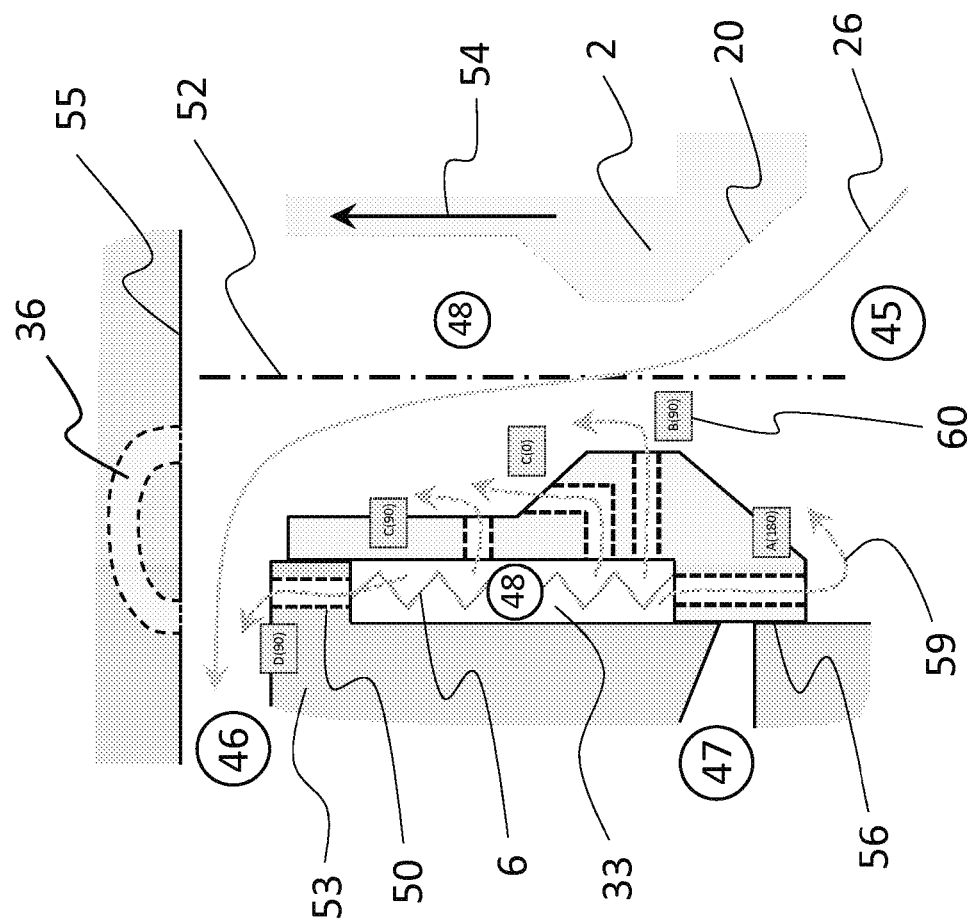
FIG. 22 is a schematic of a spool type diverter valve (DV) that shows a variety of different options for establishing a primary fluid pressure communication path between the cavity that houses the force element that biases the movable sealing element into the first mode position, and the flow path between the first and second ports.

FIG. 22 is a schematic of an embodiment of a spool type diverter valve. The figure elements and descriptions shown in this schematic are substantially similar to those shown in the schematic of FIG. 20A. There are several key differences between the two schematics. The schematic shown in FIG. 22 does not show any projected pressure areas. Instead, various possible embodiments of primary pressure communication features 50 are shown. These features communicate pressure between all of any number of unique fluid cavities 33 that each may house spring elements 6 and the main flow path between the first and second ports. For ease of understanding, FIG. 22 depicts a single effective cavity 33 housing a single effective spring element 2. Fluid flow arrows 59 indicate the direction of fluid flow out of the cavity during the transition between the first and second modes. This fluid evacuation or inflow (depending on direction of travel) is caused by the motion of the movable sealing element 2 as it transitions between its first and second mode positions. In this embodiment, the movable sealing element 2 acts to effectively decrease the volume of the spring cavity 33 during the transition from the first mode to the second mode. Conversely, during the transition from the second mode to the first mode, the volume of the spring cavity 33 increases to return its original size.

Some embodiments of the spool type diverter valve shown in FIG. 22 may use several primary fluid pressure communication channels 50 to communicate pressure between the effective spring cavity 33 and the flow path between the first and second ports have at least one channel that is substantially different from the others. This difference can either be in size, position, length, shape, or the pressure level along the flow path between the first and second ports that it communicates the spring cavity 33 with. Those trained in the art may recognize that any combination of fluid communication passages 50 can be functionally replaced by a single flow passage that generates substantially similar transition behavior of the of the movable sealing element 2 with respect to the performance metrics discussed herein.

In the embodiment of the spool type diverter valve detailed in the schematic of FIG. 22 a number of possible fluid pressure communication channels 50 between the spring cavity 33 and the main flow path between the first and second ports are shown. Each is functionally different. Also shown are corresponding fluid flow arrows 59 and labels 60. Each pressure communication channel 50 is uniquely labeled by a capital letter A through D that refers to the effective pressure level at the point along the flow path between the first and second ports that it connects the spring cavity with. Each label 60 also has a value associated with it that represents an angle in units of degrees. Each of these angles refers to the approximate angle that each of the corresponding flow paths of flow entering or exiting the spring cavity 33 through a pressure communication channel 50 describe when joining or diverging from the main flow path between the first and second ports. For example, the flow exiting the spring cavity 33 through flow channel B(90) describes a 90 degree angle in order to align with the main flow path. The flow exiting the spring cavity 33 through flow channel C(0) is already aligned with the main flow path at the point of exit. In the schematic, channels C(90) and C(0) are functionally equivalent since both channels should describe 90 degree angles to align with the main flow path, C(0) internally and C(90) just after exiting the spring cavity 33, and both exit at substantially the same point along the main flow path. The shape and size of channel C(0) is arbitrary at all points along the channel prior to the exit into the main flow path between the first and second ports.

It is assumed that flow paths C(0) and C(90) are referencing substantially equal pressure levels along the main flow path. It is also assumed that any number of spring cavities 33 and spring elements 6 can be combined into an effective single spring element 6 and single spring cavity 33 with a single pressure communication channel 50. The effective spring cavity 33 and effective spring elements 6 are assumed to produce substantially similar transition behavior to an embodiment with multiple spring cavities 33, spring elements 6, and primary fluid pressure communication channels 50, of additively similar design.

The relative placement, size, and angle with respect to the main flow path of the primary pressure communication channels 50 can substantially affect the transition behavior of the valve.

In general, the pressure level along the main flow path that any such primary pressure communication channel 50 communicates to can be manipulated in design to set the activation flow rate of the valve. For any otherwise substantially equivalent embodiment of the diverter valve with a different relative placement of the primary pressure communication channel 50 between the spring cavity 33 and the main flow cavity can have a different activation flow rate. By referencing different projected pressure areas with different pressure levels along the main flow path between the first and second ports, the net biasing force acting on the movable sealing element can be substantially different.

For example, pressure near the second port 46 is assumed to be significantly smaller than pressure near the first port 45 when the flow is going from the first to the second port. Channel A(180) communicates the pressure in the spring cavity 33 with the pressure in the main flow path near the first port 45. Channel D(90) communicates the pressure in the spring cavity 33 with the pressure in the main flow path near the second port 46. A spool 2 with channel A(180) will produce a higher pressure in the spring cavity 33 than a spool 2 with channel D(90). This higher pressure acting on the spool 2 will contribute to the net pressure force the spool 2 experiences and will activate at a higher flow rate.

The pressure at various points in the system is expected to change due to the transition of the valve from the first mode to the second mode. In some embodiments, these pressure changes can be predicted. By communicating the pressure in the spring cavity 33 to a point of predictable pressure change the valve can be tuned to produce a slower, smoother transition from the first mode to the second mode. Fast transitions may be undesirable because they could cause the pressure response of the diverter valve to be drastic. This could produce fluttering of the spool or other undesirable harshness within the system the diverter valve is substantially interacting with.

Another method for setting the desired effective biasing force acting on the movable sealing element 2 is by adjusting the design of the pressure communication channel 50, particularly the angle which it describes in order to join the main flow path. Depending on the point along the main flow path to which the pressure is communicated, a substantial range in exit angles can be achieved by design. For example, channels C(90) and C(0) both exit at substantially the same point along the main flow path, but describe substantially different angles in order to align with the main flow along the flow path between the first and second ports.

A pressure communication channel 50 between the first and second ports can be used to add damping to the transition motion of the spool 2 in order to achieve a smoother pressure response during the transition. This damping is caused by the fluid being displaced from the spring cavity 33 into the main flow path through any numbers of channels 50. The smaller the effective flow area of these effective primary pressure communication features 50, the greater is their damping effect on the movable sealing element during the transition of the spool. The channels 50 are sized to effectively act as flow restrictions. For example, during the transition between the first and second modes, the faster the spool moves, the faster fluid is forced to pass through the effective primary pressure communication channel 50, out of the cavity 33 to join the main flow path between the first and second ports, causing the pressure inside the spring cavity to rise substantially above the pressure level at the exit of the channel. This increased pressure acts on the effective projected pressure area on the surface section of the movable sealing element 2 that is exposed to the spring cavity 33, effectively introducing a pressure force, biasing the movable sealing element into the first mode position, thereby acting to slow its motion towards the second mode position.

These damping effects can be designed to vary as a function of spool 2 position during the transition of modes by letting the effective flow area of the effective primary pressure communication channel 50 vary as a function of the transition stroke position of the movable sealing element.

Another method for achieving a smooth pressure response of the diverter valve during the transition between the first mode and the second mode may involve active elements that are used to control the overall changes in pressure across any combination of flow paths between the three ports of the diverter valve. For example, such an active element could be used to actively control the amount of fluid passing between the first and third ports, thereby controlling the flow passing through the main flow path between the first and second ports. Another such an active element could be a variable flow restriction that replaces the second flow restriction along the flow path between the first and second ports.

Referring to the schematics of FIGS. 23A through 23D, shown are two solid sections of components of the diverter valve assembly 62*a* and 62*b*. One of the two sections is part of the movable sealing element 2 and the other part is part of the sealing manifold assembly 53. It is unimportant which element refers to which feature because the only relevant topic is the width of the effective flow gap between the two elements. Elements 62*a* and 62*b* act to at least partially vary an effective fluid flow area along a flow path as a function of axial travel position of the movable sealing element 2 as it transitions between the first and second modes. Such functional elements may include but are not limited to:

the radial sealing interface that seals against the flow path between the first and third ports during the first mode of the spool type embodiment of the diverter valve (Also see FIGS. 3 through 5).

primary pressure communication channels 50 that communicate the pressure in a fluid cavity that is at least partially formed by sharing surface sections with the movable sealing element 2 with pressure levels either along the flow path between the first and second ports, or any other system levels, the first flow restriction along the flow path between the first and second ports.

the second flow restriction along the first and second ports.

Referring again to FIGS. 23A through 23D; shown is a variable effective flow area 61 between the two parts 62*a* and 62*b*. This area varies as a function 66 of the relative axial 54 position 63 of the two parts 62*a* and 62*b* with respect to one another. The shape of the surface section 65 describes the effective flow area between the two parts and defines an effective sealing gap 64

Position dependent features of the diverter valve assembly that allow for flow restrictions to vary as a function of the transition stroke position of the movable sealing element 2 with respect to the manifold assembly on which it seals 53, allow for several types of settable features that can be designed to achieve desirable transition behavior and can be applied to many types of diverter valve embodiments.

One embodiment of a position dependent feature of this type can be features of the primary sealing interface between the movable sealing element and the manifold assembly 56. These features of the primary sealing interfaces can be implemented as any combination of craved channels, holes, and other types of angled or sculpted surfaces, to let the effective flow area of the flow path between the first and second ports, at the primary sealing interface, change as any function of the axial position of the movable sealing element with respect to the sealing manifold assembly. The flow path between the first and third ports can be made up of any number of unique flow passages and flow features that all serve the same function of directing at least a significant portion of flow entering the diverter valve through the first port to the third port, during the second mode.

Referring to FIG. 24; a schematic of the first fluid restriction 20 is shown along the fluid path between the first and second ports. Motion arrow 54 indicates the axial direction of the movable sealing element 2. For the purposes of discussing this schematic, the movable sealing element 2 may be understood to be of the spool type or of a similar type such as the disc type. This schematic illustrates an example of the relative shapes of the surface sections making up the first flow restriction between the movable sealing element 2 and on the manifold assembly on which it seals 53. The restriction can be formed in such a way that the effective flow area between these surfaces sections varies as a function of the relative transition stroke position of the movable sealing element 2 with respect to the manifold assembly on which it seals.

Referring to FIGS. 25A through 25D; shown are schematics of substantially similar elements and functionality to those detailed in FIGS. 23A through 23D. A substantial difference between these two sets of schematics is that one of the two solid parts, 62*b*, surrounds the other solid part 62*a* on enough sides to effectively form a fluid cavity between the two parts. The geometry produces a distinct pressure communication passage at each interface of the two parts.

Parts 62a and 62b could, but do not necessarily, represent the movable spool element 2 and the manifold on which it seals 53, irrespectively.

In the first position shown in FIG. 25A, the two parts are positioned with respect to one another such that both pressure communications passages have substantially negligible effective fluid flow areas 61. Therefore, these surface interfaces act as effective sealing interfaces between the fluid cavity 33 and the two fluid volumes at respective pressure levels 57a and 57b.

Due to the substantial difference in the respective effective lengths of each of the sealing flow restrictions as depicted, the sealing interface on the right side of part 62b is substantially less restrictive than the sealing interface to the left side of part 62b. Therefore, even in this first sealing position, the right sealing flow passage may be understood to be the primary pressure communication feature between the fluid cavity 33 and other system pressure levels. It is therefore reasonable to assume that the change in fluid pressure across the right flow passage is substantially lower at any flow rate than the change in fluid pressure over the left flow passage at the same flow rate.

As the two parts 62a and 62b move with respect to one another along the axial direction 54 of the movable sealing element 2 to other positions shown in FIGS. 25B and 25C, the effective flow area of the right flow path varies as a function 66 while the effective flow area of the sealing interface 64 that makes up the left flow passage 70 remains substantially constant and negligible.

As the two parts move with respect to another, the volume of the fluid cavity varies linearly, forcing fluid to enter or exit through the two flow passages, depending on the direction of relative motion of the two parts with respect to another. It is clear that due to the variable, position dependent nature of the effective flow restriction formed by the right flow passage, the resistive damping effect the two parts have on each other also varies in a similar manner as a function of the relative position of the two parts with respect to another along the axial direction 54.

Referring to FIGS. 26A through 26B, a schematic is shown of substantially similar elements and functionality as previously detailed in FIGS. 25A through 25D. This schematic shows a specific embodiment of a position dependent damping feature wherein the effective fluid flow area 61 and the effective restriction length of the primary pressure communication path 69 between the fluid cavity 33 and another fluid volume do not vary substantially as a function 66 of the relative position 63 of parts 62a and 62b with respect to another. This embodiment results in a substantially constant, positionally independent damping effect of one part with respect to the other part, 62a & 62b, respectively.

Referring to FIGS. 27A and 27B; shown is a schematic of two different embodiments of the second flow restriction 36 along the flow path 26 between the first and second ports. The movable sealing element 2 is shown in the second mode position of a spool type diverter valve. In the second mode positions of the embodiments of the diverter valves shown in FIGS. 27A & 27B, the ends of both spools 2 establish partial axial seals 54 with the sealing manifold assembly 53 at the sealing interface 55. Pressure levels 57a, 57b, and 57c are all pressure levels along the flow path between the first and second ports. As the fluid flow following the flow path between the first and second ports passes through the second flow restriction, an effective separation fluid pressure force acts on the surface sections forming the flow restriction. Since the effective flow area of the restriction is substantially less than the effective flow areas of the flow passages just before and just after the restriction, by design, the result is an equal and opposite pressure force acting on the pair of projected pressure areas of the second flow restriction, shown by the pair of pressure force arrows 71a & 71b.

In embodiments of this second flow restriction where all surface sections that form the restriction are part of the same part or assembly, such as in FIG. 27A, the effective separating pressure forces experienced by this part or assembly are only experienced internally and do not contribute to the overall net force balance acting on this part or assembly. This is the case for the movable sealing element 2 during the second mode, in the embodiment as shown in FIG. 27A.

In the case of the embodiment shown in FIG. 27B, the surface sections forming the second flow restriction along the flow path between the first and second ports are shared between both the movable sealing element 2 and its sealing manifold assembly 53. In this case, the net pressure separating forces acting on the surface sections forming this second flow restriction are shared between the movable sealing element and its sealing manifold assembly. Therefore, the separating pressure force generated by flow passing through the second flow restriction acts to substantially contribute to the overall net force balance acting on the shown type of embodiment of the movable sealing element during the second mode.

Figure 28A:
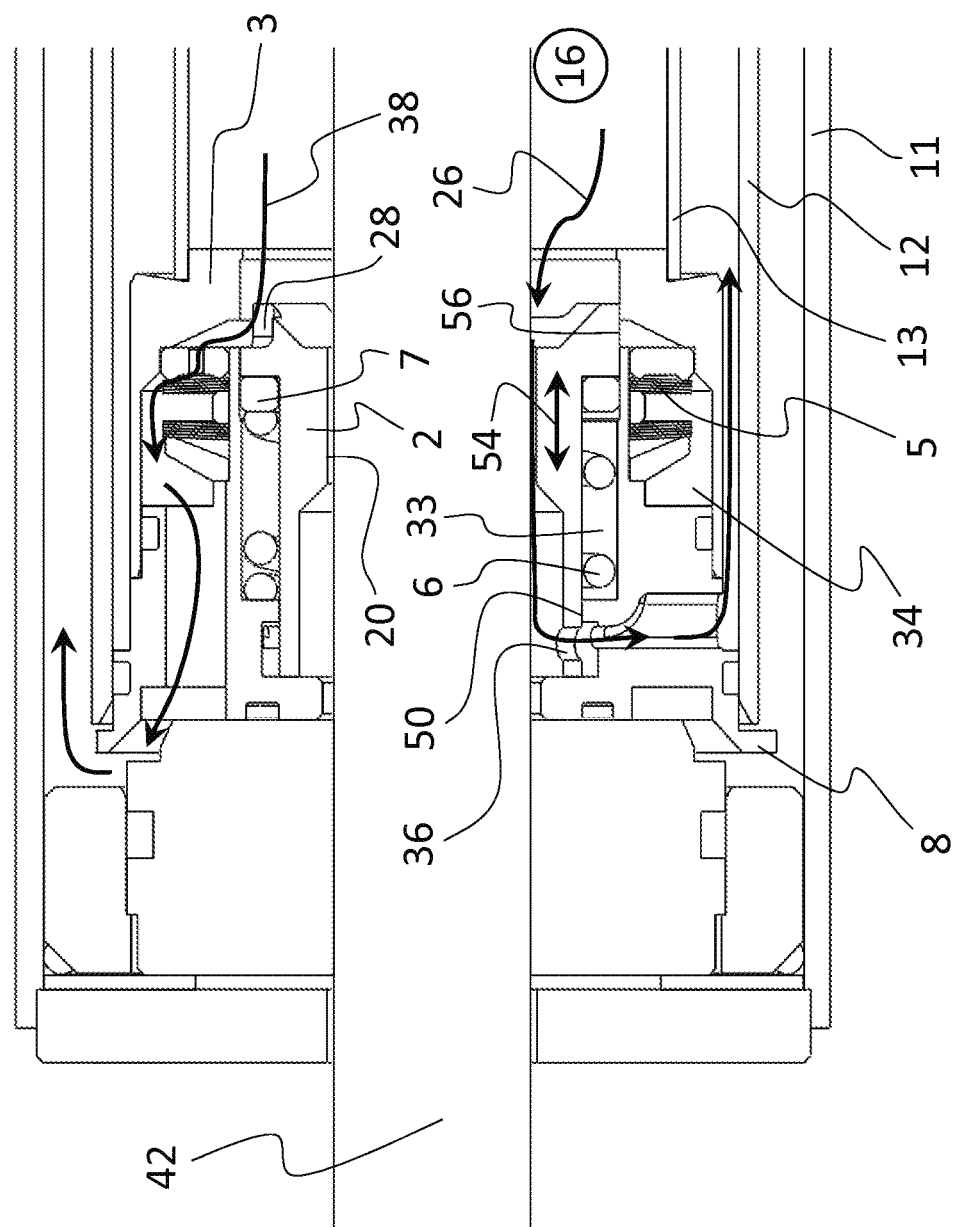
FIG. 28A is a schematic that depicts a spool type DV located in the rebound chamber of an active damper in the activated position wherein the movable sealing element is in the second mode.
Figure 28B:
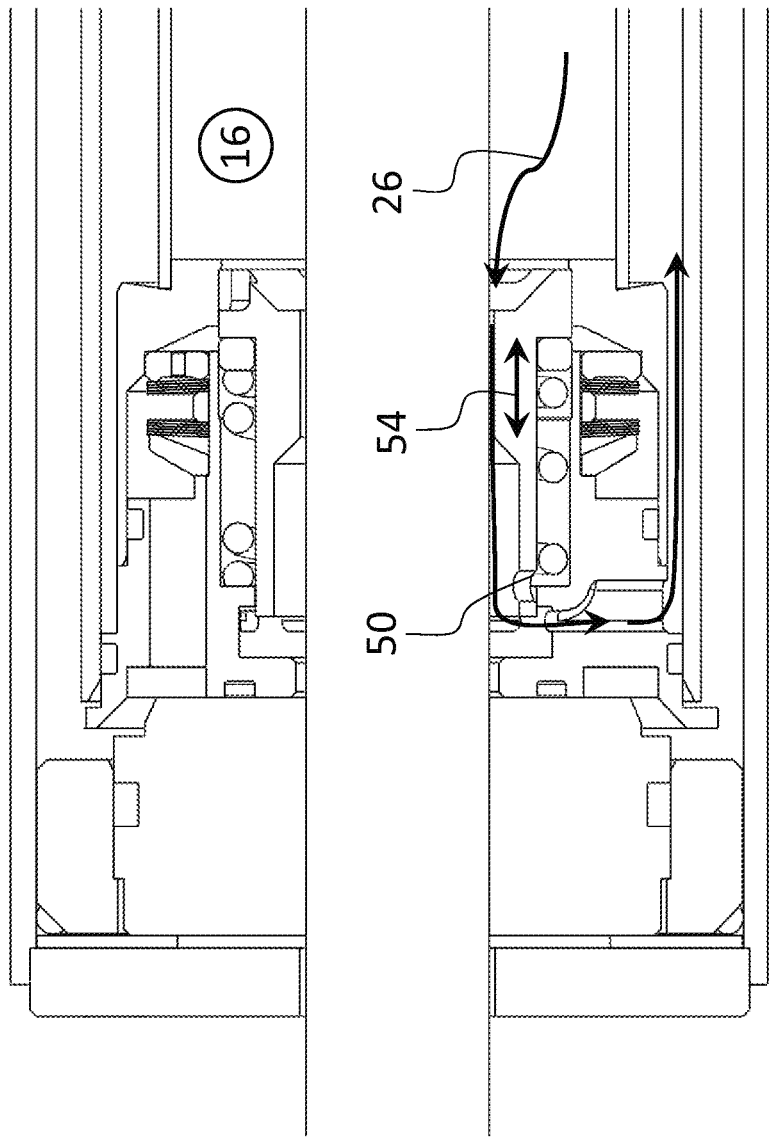
FIG. 28B is a schematic that depicts a spool type DV located in the rebound chamber of an active damper in the un-activated position.

Referring to FIGS. 28A and 28B; shown is an embodiment of a spool type rebound diverter valve (RDV). FIG. 28A shows the spool 2 in its second mode (activated) position. FIG. 28B shows the spool 2 in its first mode (de-activated) position. A remarkable feature of these embodiments that should explicitly be pointed out is the damper rod 42, along with the spool type movable sealing element 2, is partially responsible for forming the first flow restriction 20 along the flow path between the first and second ports of the diverter valve assembly, as indicated by fluid flow arrows 26. The axial direction of motion of the movable sealing element 2 is indicated by motion arrows 54. The force element 6 that biases the spool 2 into it first mode position is shown as a closed ground spring in order to distribute the spring force relatively evenly over the entire spring support 7 surface. The spring sits in the spring cavity 33 that, during the first mode, is in primary pressure communication with the flow path between the first and second ports via several radial holes situated near the end of the spool such that during the transition stroke between the first and second modes, these holes gradually close off the primary pressure communication channels 50 with between spring cavity 33 and the flow path between the first and second ports until substantially all pressure communications paths between cavity 33 and other fluid volumes are along sealing interfaces as the movable sealing element transitions to its second mode position.

This is one embodiment of a spool feature designed to variably dampen the motion of the movable sealing element 2 during its transition between the first and second modes. These radial holes serve as primary pressure communication channels 50 between the spring cavity 33 and the flow path between the first and second ports during the first mode They serve as a second flow restriction 36 between the first and second ports during the second mode, such that this second flow restriction 36 is substantially greater than the first flow restriction 20 along that same path.

In FIG. 28A, fluid flow arrows 38 are shown that follow along the flow path between the first and third ports of the diverter valve. As the spool transitions between the first and second modes, flow features 28 in the primary radial sealing interface 56 between the spool 2 and the sealing manifold 53 gradually vary the effective fluid flow area between the first and third ports as a function of axial travel position of the spool 2. A progressive valve stack 5 is designed to add an additional effective fluid restriction to the flow path between the first and third ports during the second mode as well as during the transition between modes.

Referring to FIGS. 29A through 29C; shown is a schematic of an embodiment of a spool type diverter valve at the second flow restriction along the flow path between the first and second ports. FIG. 29A shows the second flow restriction in the first mode position. FIG. 29B shows that second flow restriction at an arbitrary point in the transition stroke position. FIG. 29C shows the second flow restriction in the second mode position. According to this embodiment, in the first mode position, the primary pressure communication channel 50 between the spring cavity 33 and the flow path 26 between the first and second ports is represented as several radial holes near the end of the spool (similar to as shown in the schematics of FIGS. 28A and 28B). During the transition stroke of the spool, the effective flow area 50 of these radial holes with respect to the spool cavity 61b decreases substantially without becoming an effective sealing interface before reaching the second mode position. These radial holes act as variable damping elements on the movable sealing element 2 during its transition between modes. In this embodiment, the primary pressure communication channel 50 between the spring cavity 33 and the port with which it communicates is still substantial during the second mode.

Another feature of the spool type diverter valve detailed in FIGS. 29A through 29C is the way in which the secondary flow restriction 36a that exists in the first mode, transforms into the secondary flow restriction 36b as it exists in the second mode, by fully sealing off the original flow path 36a while simultaneously opening up a new flow passage 36b. A shaped insert 58 that is part of the manifold assembly 53 is used to define the way in which the effective flow area 61a of the secondary flow restriction, as it exists during the first mode, varies as a function of the axial stroke position of the movable sealing element 2. Simultaneously, sections of the radial holes 36b that form the primary pressure communication channels 50 between the spring cavity 33 and the flow path between the first and second ports 26 become gradually uncovered (refer to FIG. 29B), proportional to the axial stroke position of the spool. These sections fully form the second fluid flow restriction 36b during the second mode (refer to FIG. 29C), or, depending on the shape of the insert, can already contribute to the secondary flow restriction 61a prior to the spool 2 reaching the second mode position (refer to FIG. 29B).

Referring to FIGS. 30A and 30B; shown is a schematic of an embodiment of a spool type diverter valve. This embodiment is substantially similar to the embodiment shown in FIGS. 29A through 29C, the main difference being the geometry of the shaped insert 58 that is part of the manifold assembly 53 and determines how the effective flow area 61a of the second flow restriction varies as a function of the axial stroke position of the movable sealing element. In embodiment shown in FIGS. 30A and 30B, the shaped insert 58 is designed such that it creates an effective radial sealing interface 55 with the inner diameter of the end of the movable sealing element 2 at some point during the axial transition stroke between the first and second modes, such that, in the second mode, all sealing surfaces on the spool are purely oriented in the radial direction (perpendicular to the direction of travel of the spool 2 during the transition between the first and second modes).

We claim:

1. A damper system, comprising:
   a diverter valve including an inlet, a first outlet port and a second outlet port;
   a damper including at least one of a compression chamber and a rebound chamber, wherein in a free flow mode of fluid flow, fluid from at least one of the compression and rebound chamber of the damper flows into the inlet and out through the first outlet port of the diverter valve to a hydraulic device, and wherein in response to an increase in fluid flow velocity above a predetermined velocity, the diverter valve at least partially closes the first outlet port and opens the second outlet port to operate in a diverted bypass flow mode;
   wherein the second outlet port is a bypass that allows fluid to bypass the hydraulic device.

2. The system of claim 1, wherein the damper is a fully active damper and the hydraulic device is a hydraulic pump/motor.

3. The system of claim 1, wherein during the diverted bypass flow mode the first outlet port is only partially closed.

4. The system of claim 1, wherein during the diverted bypass flow mode the first outlet port is completely closed.

5. The system of claim 1, further comprising a damping valve in fluid communication with the second outlet port such that fluid flowing through the second outlet port is then restricted before flowing into at least one of the compression chamber and rebound chamber.

6. The system of claim 5, wherein the damping valve comprises one of a digressive valve and a flexible disk stack.

7. The system of claim 5, wherein the damping valve is tuned to provide a smooth pressure response when the diverter valve switches from the free flow mode to the bypass diverter flow mode.

8. The system of claim 5, wherein the damping valve is tuned to provide a specified damper force-velocity characteristic when the diverter valve is operating in the diverted bypass flow mode.

9. The system of claim 1, wherein the diverted bypass flow mode activates in response to a predetermined volumetric flow rate.

10. A diverter valve for a damper, comprising:
    a first port comprising an inlet for fluid flow;
    a second port comprising a first outlet for fluid flow;
    a third port comprising a second outlet for fluid flow;
    a moveable sealing element that operates in at least two modes, wherein in a first mode the sealing element provides fluid communication between the first port and the second port, and in a second mode the sealing element provides fluid communication between the first port and the third port;
    a force element that biases the moveable sealing element to operate in the first mode; and
    a fluid restriction between the first port and the second port such that there is a drop in fluid pressure from the first port to the second port;
    wherein at least part of a first side of the moveable sealing element is in fluid communication with the first port, and at least part of a second side of the moveable sealing element is in fluid communication with the second port, such that a net pressure above a first threshold acting on the first side moves the sealing element to operate in the second mode.

11. The diverter valve of claim 10, wherein net pressure below a second threshold, acting on the first side of the moveable sealing element, moves the sealing element to operate in the first mode.

12. The diverter valve of claim 10, wherein the second mode additionally provides a flow path between the first and second ports such that during the second mode fluid from the first port is in communication with both the second and third ports.

13. The diverter valve of claim 12, wherein during the second mode the flow path between the first and second ports is more restrictive than the flow path between the first and second ports during the first mode.

14. The diverter valve of claim 12, wherein the second port is in fluid communication with a hydraulic pump.

15. The diverter valve of claim 10, wherein the moveable sealing element moves from the first mode to the second mode through an intermediate tunable transition mode, wherein fluid flows from the first port to both the second port and the third port in a restricted manner as a function of the moveable sealing element's axial travel position relative to the first mode position.

16. The diverter valve of claim 10, wherein the effective projected pressure area of the first side of the moveable sealing element is substantially equal in area to the second side of the moveable sealing element.

17. The diverter valve of claim 10, wherein the moveable sealing element comprises a disc or multistage disc.

18. A method comprising:
controlling a rotational velocity of a hydraulic pump/motor in an active suspension system by passively diverting at least a portion of fluid driving the hydraulic pump/motor so that a first portion of the fluid flows to the motor and a second portion of the fluid flows to at least one of a compression and a rebound chamber of an active suspension damper based on a fluid velocity.

19. A method comprising:
controlling a rotational velocity of a hydraulic pump/motor by adjusting a rate of fluid driving the motor with a passive diverter that distributes the fluid among the pump/motor and at least one of a compression and a rebound chamber of an active suspension damper in response to fluid velocity flowing into the diverter exceeding a threshold fluid velocity.

20. The method of claim 18, wherein the fluid velocity is a fluid velocity of fluid flowing to the hydraulic pump/motor.

\* \* \* \* \*